(12) United States Patent
Faxér et al.

(10) Patent No.: US 11,038,566 B2
(45) Date of Patent: Jun. 15, 2021

(54) PRECODING A TRANSMISSION FROM A MULTI-PANEL ANTENNA ARRAY

(71) Applicant: Telefonaktiebolaget LM Ericsson (publ), Stockholm (SE)

(72) Inventors: Sebastian Faxér, Järfälla (SE); Mattias Frenne, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/475,401

(22) PCT Filed: Dec. 12, 2017

(86) PCT No.: PCT/EP2017/083992
§ 371 (c)(1),
(2) Date: Jul. 2, 2019

(87) PCT Pub. No.: WO2018/127426
PCT Pub. Date: Jul. 12, 2018

(65) Prior Publication Data
US 2020/0336182 A1    Oct. 22, 2020

Related U.S. Application Data

(60) Provisional application No. 62/443,453, filed on Jan. 6, 2017.

(51) Int. Cl.
*H04B 7/0456* (2017.01)
*H04B 7/06* (2006.01)

(52) U.S. Cl.
CPC ........... *H04B 7/0469* (2013.01); *H04B 7/065* (2013.01); *H04B 7/0639* (2013.01)

(58) Field of Classification Search
CPC ... H04L 5/0082; H04L 5/0023; H04L 5/0051; H04L 5/0007; H04L 5/005; H04L 1/0009;
(Continued)

(56) References Cited

U.S. PATENT DOCUMENTS 8,831,126 B2    9/2014   Wu et al.
9,225,478 B2   12/2015   Chen et al.
(Continued)

FOREIGN PATENT DOCUMENTS

CN    102299759 A    12/2011
CN    104350689 A     2/2015
(Continued)

OTHER PUBLICATIONS

CATT, "Class A Codebook Enhancement for 20-32 Ports", 3GPP TSG RAN WG1 Meeting #87, Reno, USA, Nov. 14, 2016, pp. 1-4, R1-1611336, 3GPP.
(Continued)

*Primary Examiner* — Khanh C Tran
(74) *Attorney, Agent, or Firm* — Coats + Bennett, PLLC

(57) ABSTRACT

The invention relates to a wireless communication device configured for use in a wireless communication system, wherein, based on one or more structural properties of a multi-panel antenna array describing how the antenna array is structured into multiple panels, a precoder is selected to be applied for a transmission from the multi-panel antenna array; and wherein an information indicative of the determined precoder is signaled to a transmit radio node; the invention further refers to a transmit radio node configured for transmitting via a multi-panel antenna array in a wireless communication system, wherein signaling indicating one or more structural properties of a multi-panel antenna array describing how the antenna array is structured into multiple panels is transmitted to the wireless communication device.

30 Claims, 6 Drawing Sheets

Figure 1:
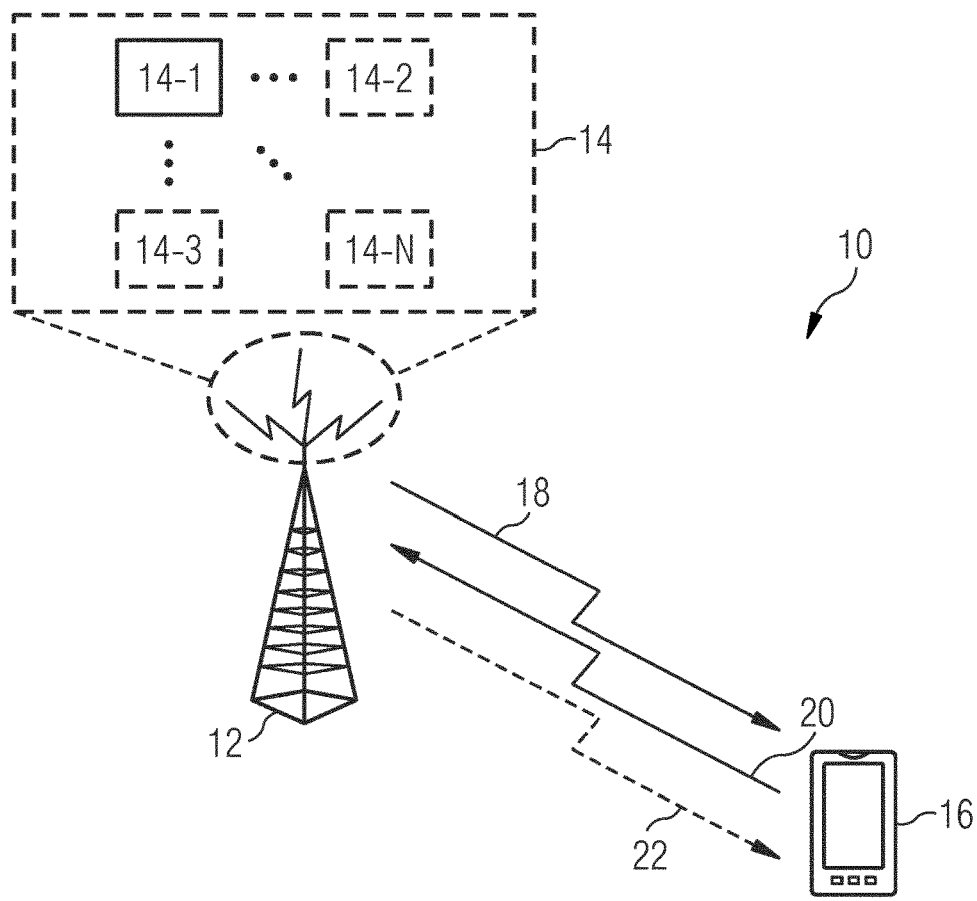

(58) Field of Classification Search
CPC ... H04L 1/0023; H04L 1/0026; H04B 7/0469; H04B 7/02; H04B 7/0617; H04B 7/0639; H04B 7/065; H04B 7/0689
See application file for complete search history.

(56) References Cited

U.S. PATENT DOCUMENTS

| | | | |
|---|---|---|---|
| 10,432,277 | B2 | 10/2019 | Li et al. |
| 10,469,146 | B1 * | 11/2019 | Ekbatani ............ H04B 7/0456 |
| 2002/0141513 | A1 * | 10/2002 | England ............... H04B 7/12 375/326 |
| 2014/0192768 | A1 | 7/2014 | Yeh et al. |
| 2015/0078472 | A1 | 3/2015 | Vook et al. |
| 2016/0112892 | A1 * | 4/2016 | Damnjanovic ... H04W 72/0446 370/336 |
| 2019/0229786 | A1 * | 7/2019 | Huang ............... H04B 7/0478 |
| 2019/0260453 | A1 * | 8/2019 | Huang ............... H04B 7/0617 |
| 2019/0363760 | A1 * | 11/2019 | Wu ..................... H04B 7/0456 |
| 2020/0007292 | A1 * | 1/2020 | Huang ............... H04L 5/0094 |

FOREIGN PATENT DOCUMENTS

| | | |
|---|---|---|
| GB | 2492564 A | 1/2013 |
| JP | 2015513280 A | 4/2015 |
| KR | 20130143106 A | 12/2013 |
| KR | 20140089312 A | 7/2014 |
| KR | 20150080523 A | 7/2015 |
| WO | 2012094243 A1 | 7/2012 |
| WO | 2014065850 A1 | 5/2014 |
| WO | 2015172807 A1 | 11/2015 |
| WO | 2016155297 A1 | 10/2016 |
| WO | 2016203439 A1 | 12/2016 |
| WO | 2017039511 A1 | 3/2017 |
| WO | 2018031807 A1 | 2/2018 |
| WO | 2018059567 A1 | 4/2018 |

OTHER PUBLICATIONS

Intel Corporation, "Discussion on NR Codebook Design", 3GPP TSG-RAN WG1 #87, Reno, USA, Nov. 14, 2016, pp. 1-9, R1-1611983, 3GPP.

Huawei et al., "Codebook Design for Multi-Panel Structured MIMO in NR", 3GPP TSG RAN WG1 Meeting #87, Reno, USA, Nov. 14, 2016, pp. 1-5, R1-1611666, 3GPP.

3rd Generation Partnership Project, "3rd Generation Partnership Project; Technical Specification Group Radio Access Network; Evolved Universal Terrestrial Radio Access (E-UTRA); Physical Channels and Modulation (Release 14)", Technical Specification, 3GPP TS 36.211 V14.4.0, Sep. 1, 2017, pp. 1-197, 3GPP.

* cited by examiner

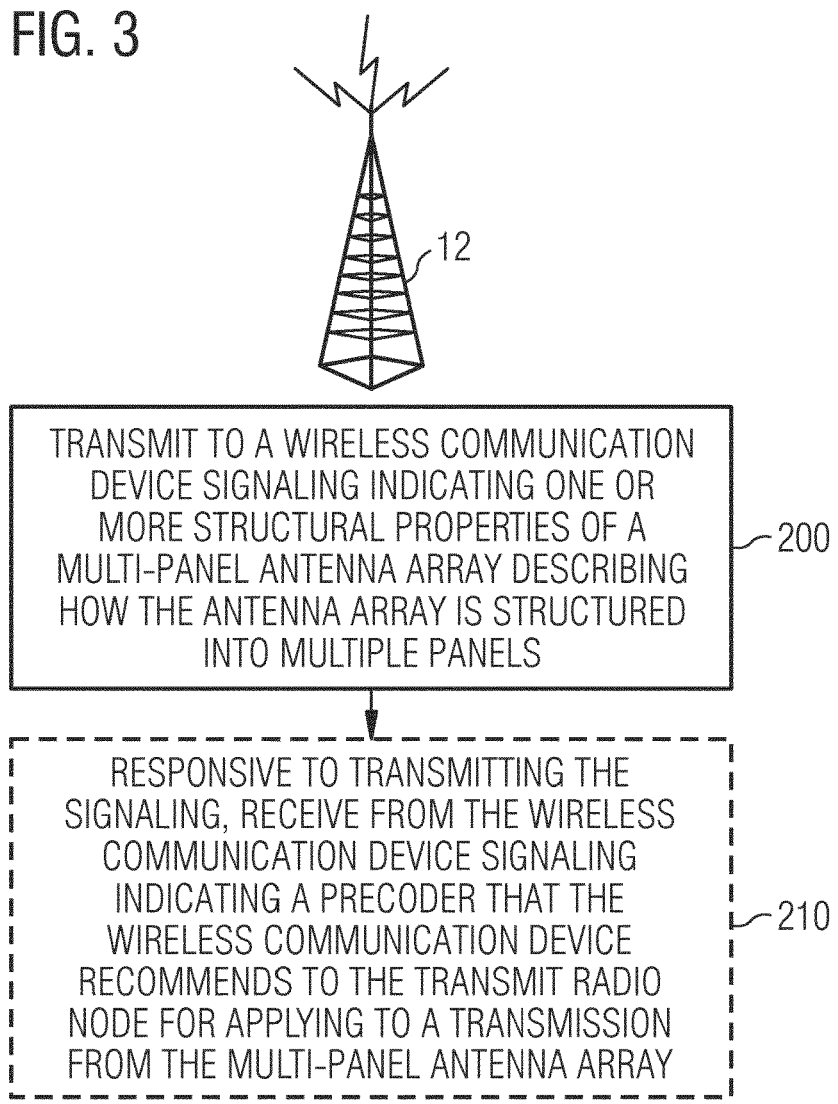
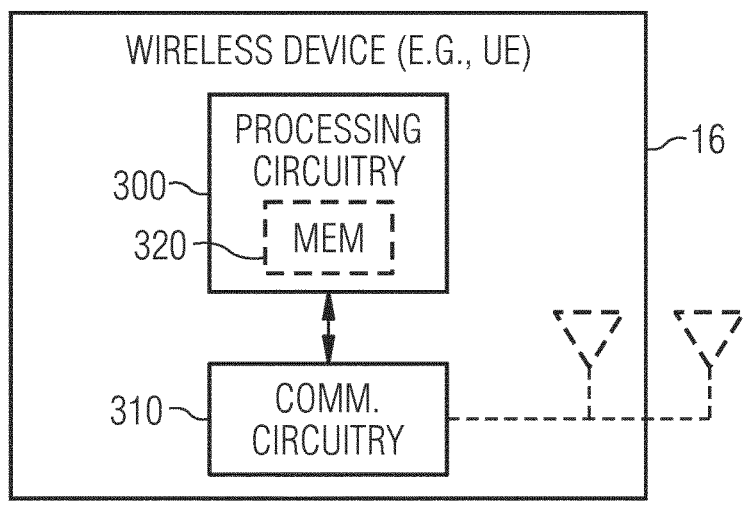

PRECODING A TRANSMISSION FROM A MULTI-PANEL ANTENNA ARRAY

BACKGROUND

Precoding a transmission from a transmit antenna array involves applying a set of complex weights to the signals that are to be transmitted from the array's antenna elements, so as to independently control the signals' phase and/or amplitude. This set of complex weights is referred to as a "precoder" or "precoding matrix". The transmitting radio node conventionally chooses the precoder to match the current channel conditions on the link to the receiving radio node, with the aim of maximizing the link capacity or quality. If multiple data streams are simultaneously transmitted from the array's antenna elements using spatial multiplexing, the transmitting radio node also typically chooses the precoder with the aim of orthogonalizing the channel and reducing inter-stream interference at the receiving radio node.

In closed-loop operation, the transmitting radio node selects the precoder based on channel state information (CSI) fed back from the receiving radio node that characterizes the current channel conditions. The transmitting radio node in this regard transmits a reference signal from each antenna element to the receiving radio node, and the receiving radio node sends back CSI based on measurement of those reference signals.

Transmission of the CSI feedback threatens to contribute significant overhead to precoding schemes. Known approaches address overhead attributable to CSI feedback by limiting the usable precoders to a fixed set of precoders, i.e., a codebook. Each precoder in the codebook is assigned a unique index that is known to both the transmitting node and the receiving node. The receiving node determines the "best" precoder from the codebook, and feeds back the index of that precoder (often referred to as a "precoding matrix indicator", PMI) to the transmitting node as a recommendation (which the transmitting node may or may not follow). Feeding back only an index, in conjunction with other CSI such as the recommended number of data streams (i.e., transmission rank) for spatial multiplexing, reduces the number of transmission resources required for transporting that CSI. This approach therefore reduces CSI feedback overhead considerably.

Known approaches design precoder codebooks for CSI feedback with single-panel antenna arrays in mind that fit all hardware components of the array into a single panel.

SUMMARY

One or more embodiments herein provide precoding tailored for multi-panel antenna arrays. Precoding may for instance account for the different structural properties that different types of multi-panel antenna arrays may have in terms of how the antenna arrays are structured into multiple panels (e.g., in terms of the number and/or spatial arrangement of the panels). Precoding recommendations from a wireless communication device may therefore likewise be based, at least implicitly, on one or more structural properties of the multi-panel antenna array from which the device is to receive a precoded transmission. In some embodiments, for instance, a codebook from which precoder recommendations (or actual precoders) are chosen accounts for, is tailored for, or is otherwise chosen based on the multi-panel antenna array's structural properties. Indeed, in one such embodiment, the device receives signaling from a transmit radio node indicating one or more of these structural properties, determines (e.g., calculates or selects) a precoding codebook tailored for those structural properties, and chooses a precoder to recommend from that codebook. With a precoder codebook structure tailored towards multi-panel antenna arrays, coherent transmission from the multi-panel antenna array may be realized, even in the face of non-uniform and/or uncalibrated panels.

In some embodiments, tailoring precoding (e.g., in terms of codebook design) for the multi-panel nature of multi-panel antenna arrays proves advantageous in that it improves the quality of precoding as well as precoder recommendations (and CSI reports in general), e.g., as compared to precoding schemes designed implicitly assuming a single-panel array. This is especially true for Discrete Fourier Transform (DFT) precoding, as applying a DFT precoder across multiple antenna panels may lead to poor precoding performance, especially if the antenna panels are uncalibrated with respect to one another and/or mismatched in terms of their antenna element spacing.

More particularly, embodiments herein include a method performed by a wireless communication device configured for use in a wireless communication system. The method comprises determining, based on one or more structural properties of a multi-panel antenna array describing how the antenna array is structured into multiple panels, a precoder to recommend to a transmit radio node for applying to a transmission from the multi-panel antenna array. In some embodiments, the method also comprises receiving signaling indicating the one or more structural properties. Regardless, the method may also comprise signaling the determined precoder to the transmit radio node.

Embodiments herein also include a method implemented by a transmit radio node configured for transmitting via a multi-panel antenna array in a wireless communication system. The method comprises transmitting to a wireless communication device signaling indicating one or more structural properties of a multi-panel antenna array describing how the antenna array is structured into multiple panels. In some embodiments, the method also comprises, responsive to transmitting that signaling, receiving from the wireless communication device signaling indicating a precoder that the wireless communication device recommends to the transmit radio node for applying to a transmission from the multi-panel antenna array.

Embodiments moreover include corresponding apparatus, computer programs, and computer readable storage mediums.

Figure 2:
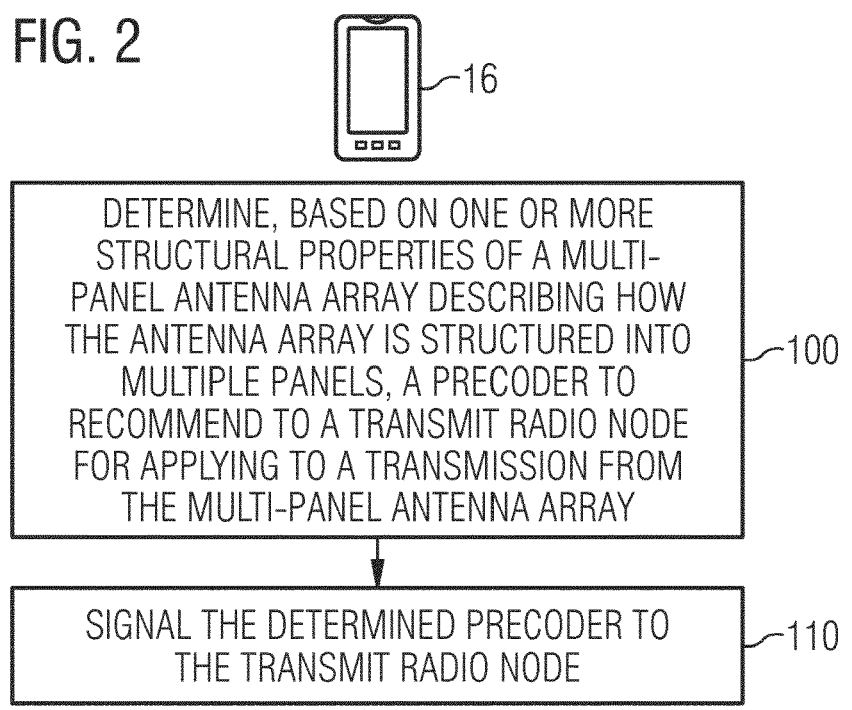
Figure 5:
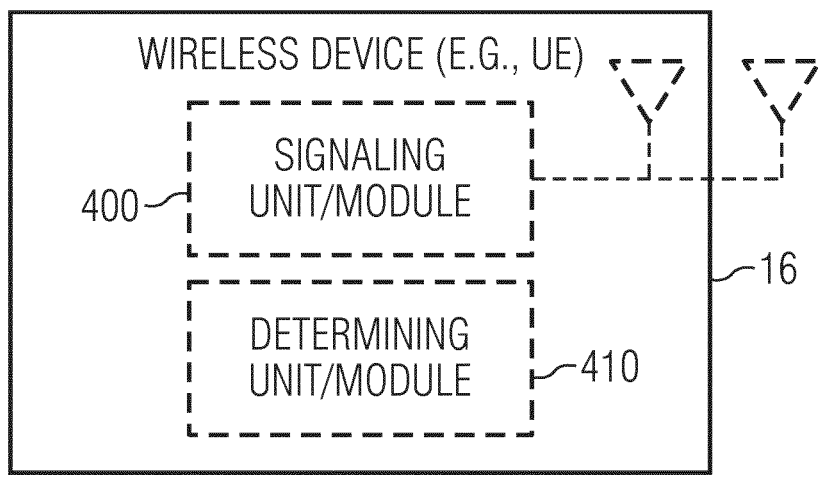
Figure 6:
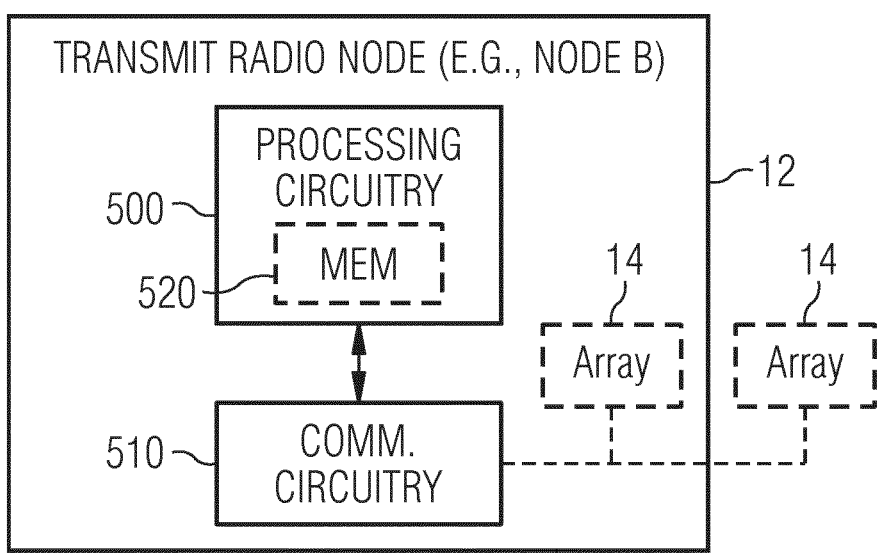
Figure 7:
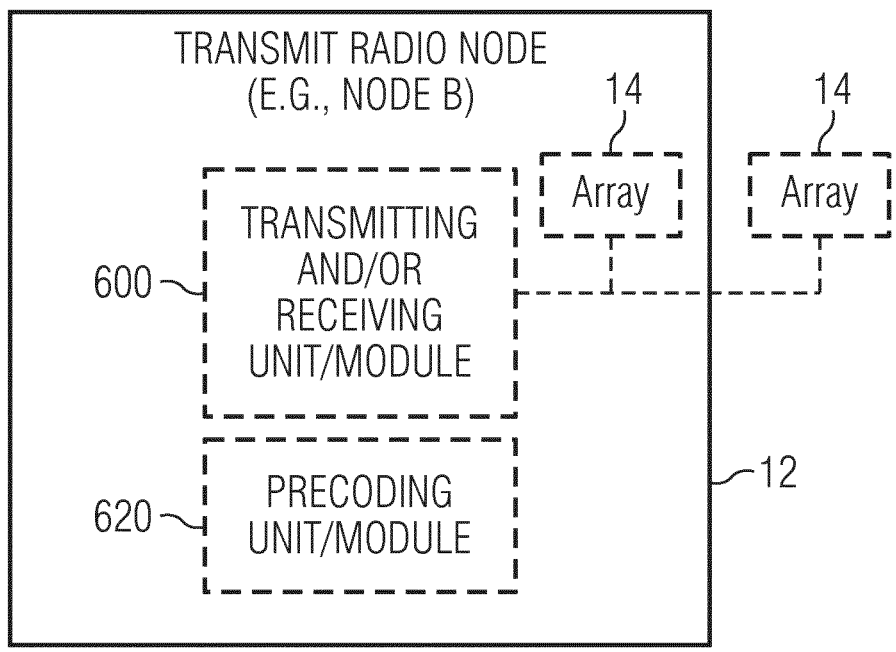
Figure 8:
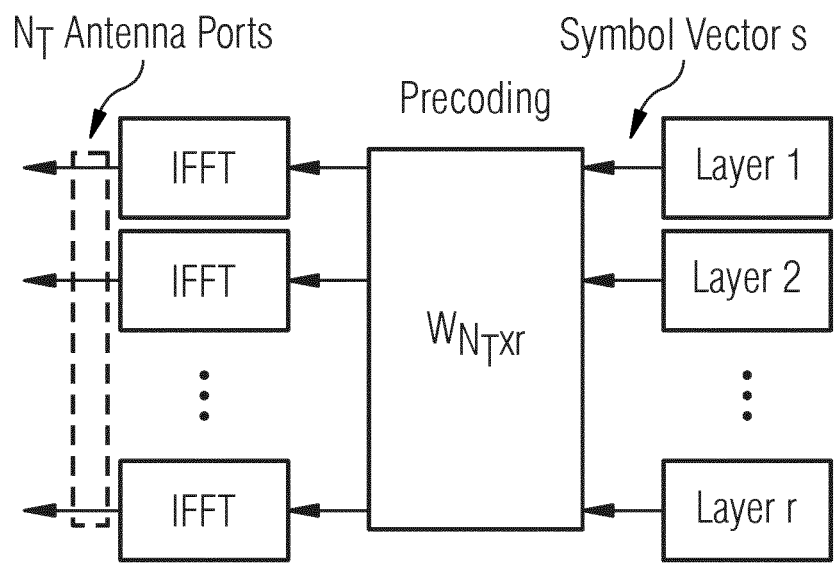
Figure 9:
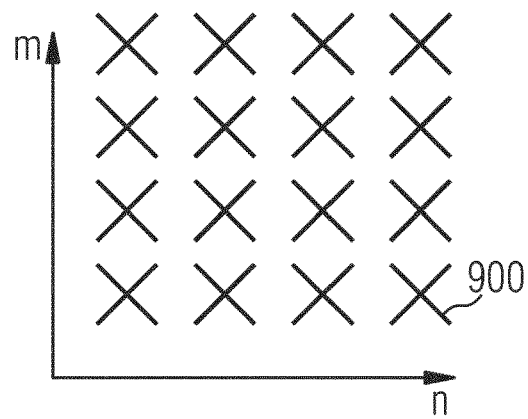
Figure 10:
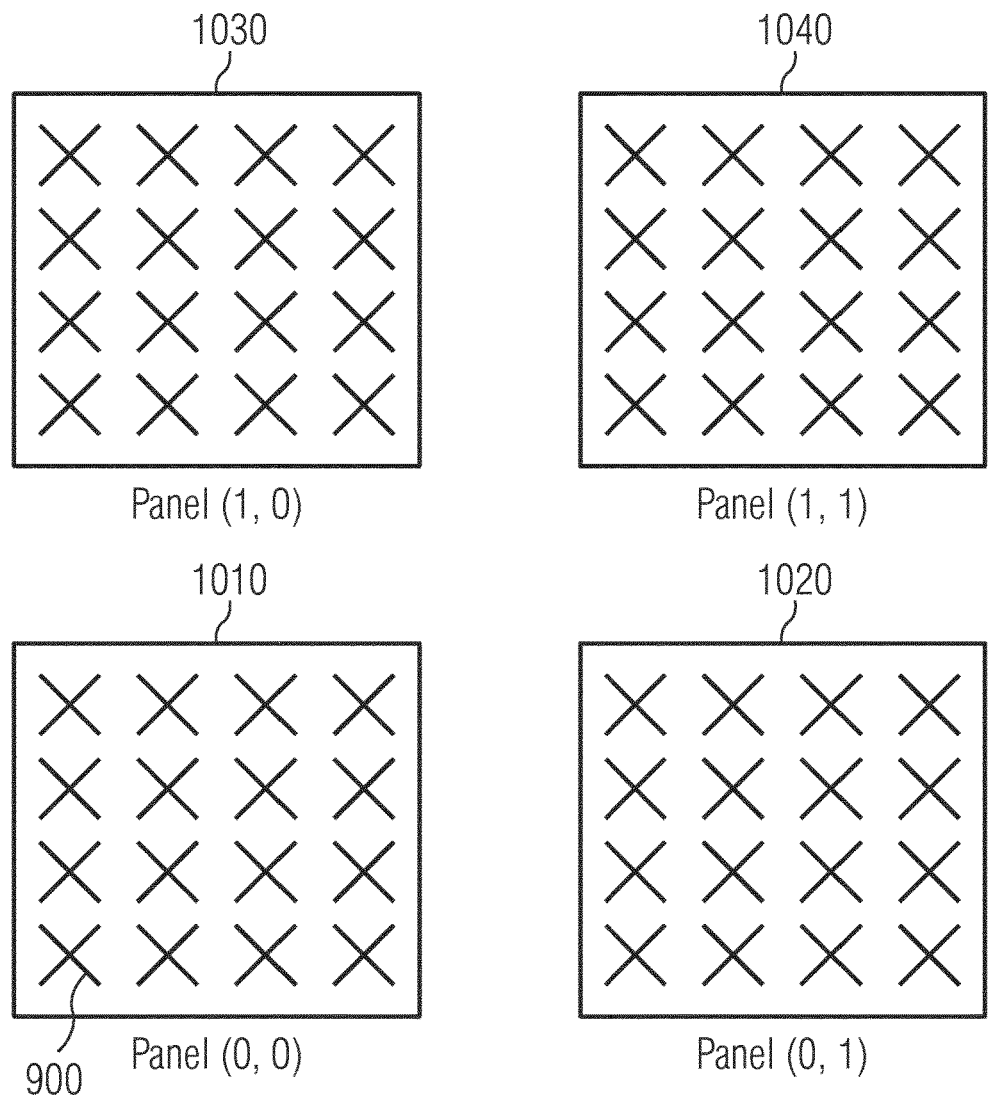
Figure 11:
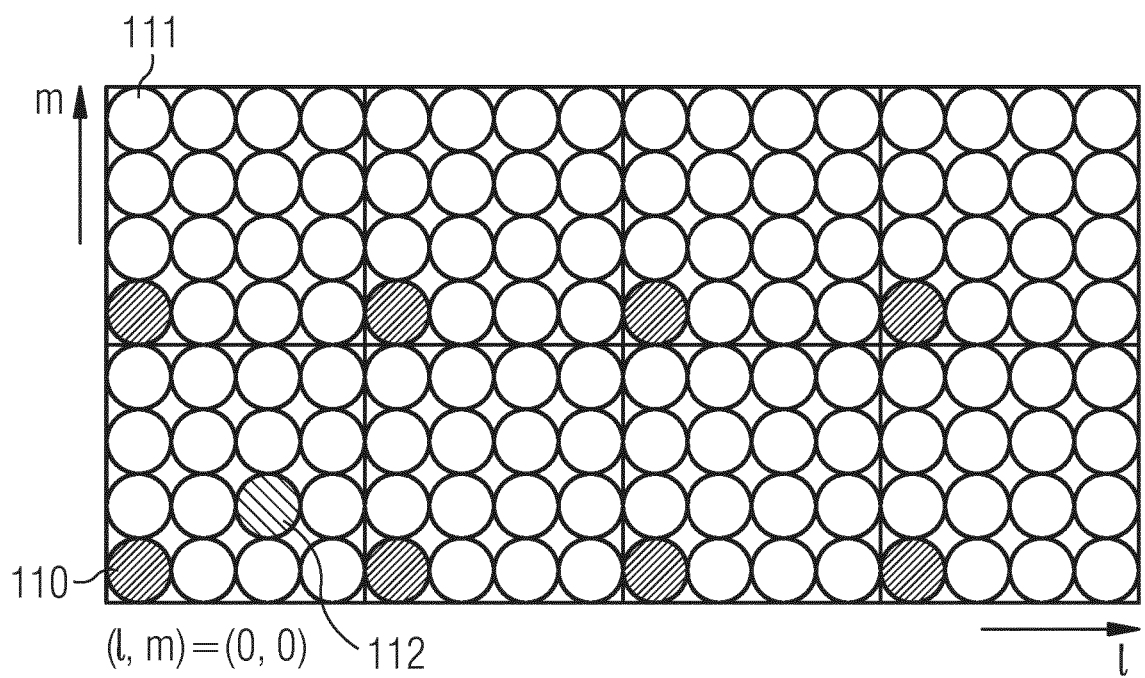

FIG. 1 illustrates a wireless communication system according to one or more embodiments, FIG. 2 illustrates a processing performed by a device of the wireless communication system according to some embodiments, FIG. 3 illustrates processing performed by the transmit radio node of the wireless communication system according to some embodiments, FIG. 4 shows an exemplary structural block diagram of the wireless communication device according to some embodiments, FIG. 5 shows an exemplary functional block diagram of the wireless communication device according to some embodiments, FIG. 6 shows an exemplary structural block diagram of the transmit radio node according to some embodiments, FIG. 7 shows an exemplary functional block diagram of the transmit radio node according to some embodiments, FIG. 8 illustrates a spatial multiplexing operation, FIG. 9 shows an example of an antenna array with 4×4 cross-polarized antenna elements, FIG. 10 shows an example of a 2×2 multi-panel antenna array with 4 cross-polarized panels, and FIG. 11 shows exemplary precoders forming a grid of DFT beams.

DETAILED DESCRIPTION

FIG. 1 illustrates a wireless communication system 10 according to one or more embodiments. The system 10 includes a transmit radio node 12, shown in the form of a base station, that performs transmissions via a multi-panel antenna array 14. The array 14 is structured into multiple panels 14-1, 14-2, . . . 14-N. The panels may be spatially arranged in a single spatial dimension (e.g., stacked vertically or aligned horizontally) or multiple spatial dimensions. Each panel 14-n in turn has one or more antenna elements arranged in one or more spatial dimensions.

The transmit radio node 12 may perform a transmission 18 via the array 14 by feeding one or more signals of the transmission 18 to one or more antenna elements of the array 14, respectively. The radio node 12 in some embodiments independently controls the amplitude and/or phase of the signal(s) fed to the array's antenna element(s), as part of precoding the transmission 18 from the array 14. The radio node 12 in this regard applies a precoder (e.g., a precoding matrix) to the transmission 18. The radio node 12 may select the precoder to which to apply to the transmission 18 based on a recommendation that the wireless device 16 feeds back to the radio node 12 via signaling 20. Notably, some embodiments herein tailor the radio node's precoding and/or the device's precoder recommendation to the structural properties of the particular multi-panel antenna array 14 via which the precoded transmission is transmitted, e.g., in terms of how the array 14 is structured into multiple panels. FIG. 2 illustrates processing performed by the device 16 according to some embodiments in this regard.

As shown in FIG. 2, processing at the device 16 includes determining, based on one or more structural properties of the multi-panel antenna array 14 describing how the antenna array 14 is structured into multiple panels 14-1, 14-2, . . . 14-N, a precoder to recommend to the transmit radio node 12 for applying to a transmission 18 from the multi-panel antenna array 14 (Block 100). The one or more structural properties may include, for example, the total number of array's panels, the number of panels in each of one or more spatial dimensions in which the panels are arranged, and/or a spatial arrangement of the panels. Regardless, processing also includes signaling the determined precoder to the transmit radio node 12 (Block 110).

In some embodiments, the device 16 is able to base the recommended precoder on these one or more structural properties because the device 16 receives signaling 22 (e.g., from the transmit radio node 12 or some other node) indicating those one or more structural properties. Indeed, in at least some embodiments, the device 16's mobile nature means that the device 16 may (simultaneously or at different times) receive transmissions from different types of antenna arrays, including even different types of multi-panel antenna arrays that may be structured into multiple panels in different ways (e.g., with a different number of panels and/or spatial arrangement of the panels). This signaling 22 may therefore inform the device about the structural properties of the particular multi-panel antenna array from which the device 16 is to receive a transmission 18. FIG. 3 illustrates processing performed by the transmit radio node 12 in this regard.

As shown in FIG. 3, processing by the transmit radio node 12 may include transmitting to the wireless communication device 16 signaling 22 indicating one or more structural properties of the multi-panel antenna array 14 describing how the antenna array 14 is structured into multiple panels (Block 200). Again, the one or more structural properties may include, for example, the total number of array's panels, the number of panels in each of one or more spatial dimensions in which the panels are arranged, and/or a spatial arrangement of the panels.

This signaling 22 may be radio resource control (RRC) signaling, medium access control (MAC) signaling, or physical layer signaling. In one embodiment, for instance, the signaling 22 is transmitted or received during a procedure for configuring a channel state information (CSI) process or a CSI reference signal (CSI-RS) resource. In other embodiments, though, the signaling may be included in a downlink control information (DCI) message on a physical downlink control channel. For instance, the DCI message may convey scheduling information, e.g., in the form of an uplink grant for the device 16 to transmit a CSI feedback report to the transmit radio node 12.

In any event, processing at the transmit radio node 12 in some embodiments may further include, responsive to transmitting the signaling 22, receiving from the wireless communication device the signaling 20 indicating a precoder that the wireless communication device 16 recommends to the transmit radio node 12 for applying to the transmission 18 from the multi-panel antenna array 14 (Block 210). As noted above, because the device 16 bases its determination of the recommended precoder on the structural properties of the array 14, the recommended precoder reflects the one or more structural properties that the radio node 12 indicated to the device 16 via signaling 22.

Processing may then entail determining the actual precoder to apply to the transmission 18, based on the precoder recommended by the device 16 (e.g., the recommended precoder may or may not be actually used, at the transmit radio node's discretion). Processing may next entail precoding the transmission 18 from the array 14 using the determined precoder, and transmitting the transmission 18.

Where codebook-based precoding is used, tailoring precoding for the array's panel-related structural properties may involve using a codebook that accounts for, is designed or tailored for, or is otherwise chosen based on the multi-panel antenna array's structural properties. Determining in Step 110 of FIG. 2 may for instance involve determining a multi-panel precoding codebook based on the one or more structural properties. Indeed, there may be multiple different possible precoding codebooks that respectively correspond to different possible ways in which antenna arrays are structurable into multiple panels. The device 16 may need to determine which one of those possible codebooks to use for the particular array's structural properties. Regardless, the determining may then involve selecting the precoder from the determined multi-panel precoding codebook, based on measurement of one or more reference signals transmitted from the multi-panel antenna array 14.

In some embodiments, the multi-panel precoding codebook may be an inter-panel precoding codebook (e.g., inter-panel cophasing precoding codebook). This codebook may be dedicated to precoding across the panels of the array 14 (e.g., via scalar or vector quantization as described more fully below), as opposed to precoding within each individual array. Precoders in the inter-panel precoding codebook may for instance perform precoding so as to co-phase panels of the array (e.g., in order to perform coherent multi-panel transmission whereby antenna ports corresponding to different panels are combined onto the same transmission layer). This may aim to compensate for phase offset attributable to the non-uniform and/or uncalibrated nature of the array's panels.

In some embodiments, for instance, the multiple panels include at least some panels that have identical antenna port layouts and intra-panel antenna port indices. In this case, an actual or recommended precoder (that co-phases panels) may apply the same phase offset between antenna ports that correspond to spatially adjacent panels and that have the same intra-panel antenna port indices. That is, considering two identical panels and where the antenna ports corresponding to a panel is indexed with i so that (i,0) denotes antenna port number I corresponding to a first panel and (i,1) denotes antenna number I corresponding to a second panel, then the phase shift between (i,0)->(i,1) is the same for all antenna ports i.

Alternatively or additionally, an actual or recommended precoder (that co-phases panels) may be configured to apply, for each of the multiple panels, a panel-specific complex weight to all antenna ports corresponding to that antenna panel. This panel-specific complex weight may be for instance a phase shift with unitary amplitude.

Regardless, the device 16 may signal the recommended precoder to the transmit radio node 12 as an index into the inter-panel precoding codebook. The device 16 in some embodiments may further signal an index indicating a recommended intra-panel precoder selected from an intra-panel precoding codebook and/or an index indicating a recommended polarization co-phasing precoder selected from a polarization co-phasing precoding codebook.

As explained more fully below, for instance, the overall precoding $W_{MP}$ applied to the transmission 18 may be factorized into $W_1$, $W_2$, and/or $W_3$ precoders. In some embodiments, the recommended precoder is a particular $W_3$ precoder from an inter-panel precoding codebook comprising multiple different possible $W_3$ precoders. The device 16 may recommend such a precoder by signaling an index (e.g., precoding matrix indicator, PMI) into the $W_3$ precoder codebook. The codebook may be for instance the LTE 4TX rank-1 Householder codebook, a subsampled and/or punctured version of the LTE 4TX rank-1 Householder codebook, or a DFT codebook, as described more fully below.

The device 16 may separately signal an index into a $W_1$ precoder codebook (i.e., an inter-panel precoding codebook) and/or a $W_2$ precoder codebook (i.e., a polarization co-phasing precoding codebook).

Alternatively, the recommended precoder may be a precoder that combines a particular $W_3$ precoder with a particular $W_2$ precoder (e.g., resulting in a particular $W_{23}$ as described below) and/or a particular $W_1$ precoder.

In any event, tailoring precoding (e.g., in terms of codebook design) for the multi-panel nature of multi-panel antenna arrays may prove advantageous in that it improves the quality of precoding as well as precoder recommendations (and CSI reports in general), e.g., as compared to precoding schemes designed implicitly assuming a single-panel array. This is especially true for Discrete Fourier Transform (DFT) precoding, as applying a DFT precoder across multiple antenna panels may lead to poor precoding performance, especially if the antenna panels are uncalibrated with respect to one another and/or mismatched in terms of their antenna element spacing.

Note that some embodiments herein have contemplated feedback of a recommended precoder using codebook-based precoding. Other embodiments herein extend to non-codebook-based precoding, whereby the CSI feedback is nonetheless determined based on the one or more structural properties of the array 14 in a similar way as described above for codebook-based precoding.

Also note that, although FIG. 1 illustrates radio node 12 in the form of a base station and wireless device 16 in the form of a UE, such need not be the case. Radio node 12 in other embodiments may be a UE and wireless device 16 may be a base station. Accordingly, embodiments herein may be applicable for either the uplink or downlink direction. Even further, embodiments herein may also be used for machine-to-machine communication, e.g., both nodes 12, 16 are UEs.

Still further, although FIG. 1 illustrates device 16 as transmitting signaling 20 to the same radio node 12 from which reference signal(s) were received, such need not be the case. In other embodiments, the device 16 may transmit signaling to a different radio node.

In general, therefore, embodiments herein are applicable to any type of wireless communication system 10. Indeed, embodiments may use any of one or more communication protocols known in the art or that may be developed, such as IEEE 802.xx, CDMA, WCDMA, GSM, LTE, UTRAN, WiMax, or the like. Accordingly, although sometimes described herein in the context of LTE or 5G, the principles and concepts discussed herein are applicable to other systems as well.

A radio node as used herein is therefore any type node capable of communicating with another radio node wirelessly over radio signals. A radio node may for example be a radio network node, e.g., in a radio access network (RAN) of the system 10. The radio network node may for instance be a base station, a relay node, or the like.

Alternatively, a radio node may be a wireless device and may therefore refer to a user equipment (UE), a mobile station, a laptop, a smartphone, a machine-to-machine (M2M) device, a machine-type communications (MTC) device, a narrowband Internet of Things (IoT) device, etc. That said, although a radio node in the form of a wireless device may be a UE, it should be noted that the wireless device does not necessarily have a "user" in the sense of an individual person owning and/or operating the device. A wireless device may also be referred to as a wireless communication device, a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but may be generally configured to transmit and/or receive data without direct human interaction.

In an IOT scenario, a wireless device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

In view of the above variations and modifications, a wireless communication device 16 as described above may perform any of the processing herein by implementing any functional means or units. In one embodiment, for example, the wireless communication device 16 comprises respective circuits or circuitry configured to perform the steps shown in FIG. 2. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

FIG. 4 illustrates a wireless communication device 16 in accordance with one or more embodiments. As shown, the wireless communication device 16 includes processing circuitry 300 and communication circuitry 310. The communication circuitry 310 (e.g., radio circuitry) is configured to transmit and/or receive information to and/or from one or more other nodes, e.g., via any communication technology. The communication circuitry 310 may do so for instance via one or more antennas, which may be internal or external to the wireless communication device 16. The processing circuitry 300 is configured to perform processing described above, e.g., in FIG. 2 such as by executing instructions stored in memory 320. The processing circuitry 300 in this regard may implement certain functional means, units, or modules.

FIG. 5 illustrates a wireless communication device 16 in accordance with one or more other embodiments. As shown, the wireless communication device 16 implements various functional means, units, or modules, e.g., via the processing circuitry 300 in FIG. 4 and/or via software code. These functional means, units, or modules, e.g., for implementing the method in FIG. 2, include for instance a determining unit or module 410 for determining the recommended precoder as described above, and a signaling unit or module 400 for signaling the determined precoder to the transmit radio node 12.

Note also that a transmit radio node 12 as described above may perform any of the processing herein by implementing any functional means or units. In one embodiment, for example, the transmit radio node 12 comprises respective circuits or circuitry configured to perform the steps shown in any of FIG. 3. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

FIG. 6 illustrates a transmit radio node 12 in accordance with one or more embodiments. As shown, the transmit radio node 12 includes processing circuitry 500 and communication circuitry 510. The communication circuitry 510 (e.g., radio circuitry) is configured to transmit and/or receive information to and/or from one or more other nodes, e.g., via any communication technology. The communication circuitry 510 may do so for instance via the multi-panel antenna array 14, which may be internal or external to the transmit radio node 12. The processing circuitry 500 is configured to perform processing described above, e.g., in FIG. 3, such as by executing instructions stored in memory 520. The processing circuitry 500 in this regard may implement certain functional means, units, or modules.

FIG. 7 illustrates a transmit radio node 12 in accordance with one or more other embodiments. As shown, the transmit radio node 12 implements various functional means, units, or modules, e.g., via the processing circuitry 500 in FIG. 6 and/or via software code. These functional means, units, or modules, e.g., for implementing the method in FIG. 3, include for instance a transmitting and/or receiving unit or module 600 for transmitting signaling 22, receiving signaling 20, and/or transmitting the transmission 18. Also included may be a precoding unit or module 620 for determining the precoder to apply and/or for precoding the transmission 18.

Those skilled in the art will also appreciate that embodiments herein further include corresponding computer programs.

A computer program comprises instructions which, when executed on at least one processor of a node 12 or 16, cause the node 12 or 16, to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

Without loss of generality, one or more embodiments herein will now be described, sometimes with reference to New Radio (NR) or 5G terminology. For example, some embodiments are described with reference to a Next Generation NodeB (gNB) and/or a user equipment (UE). However, these embodiments are not limited to NR or 5G technology, but are to be extended more generally to any wireless technology (e.g., LTE or 4G and beyond). In this regard, aspects described with regard to an gNB and/or UE below may be attributed to the more general terminology used above; namely, a radio network node (of which a gNB is an example) and a wireless communication device (of which a UE is an example).

Some embodiments herein comprise methods for channel state information (CSI) feedback that enable multiple-input multiple-output (MIMO) transmission from multi-panel antenna arrays, and more specifically, comprise precoder codebook designs that enable coherent and/or non-coherent multi-panel transmission. Known approaches design precoder codebooks for CSI feedback with single-panel antenna arrays in mind. Directly applying such CSI feedback to systems where multi-panel antenna arrays are used may lead to poor performance since the structure of the multi-panel antenna array is not taken into account in the CSI feedback. Better system throughput can thus be achieved if the CSI feedback reflects the multi-panel antenna array (e.g., its structure). This may be attained by using a precoder codebook structure that reflects the multi-panel antenna array being used by the transmitter, and the design of such a multi-panel precoder codebook structure is the object of some embodiments herein.

In some embodiments, a wireless communication device (e.g., a user equipment, UE) is configured to report CSI feedback corresponding to the certain multi-panel antenna array setup used at the Next Generation Node B (gNB). The configuration comprises signaling of codebook parameters enabling the UE to determine the precoder codebook to use for calculating CSI feedback. Comprised in the codebook parameters are parameters relating to the multi-panel setup along with other parameters such as the number of antenna ports in the codebook. In some embodiments, the multi-panel codebook is designed with a two-dimensional panel setup in mind, and the number of antenna panels in each dimension, signaled to the UE. In other embodiments, the spatial distribution of the antenna panels does not need to be known in order to determine the codebook and only the number of antenna panels is signaled to the UE.

The signaling of codebook parameters may be done via radio resource control (RRC) signaling, and may be part of a configuration of a CSI process or a configuration of a channel state information reference signal (CSI-RS) resource, for instance. Such RRC configuration is typically done in a semi-static fashion, so that the codebook is configured once when connecting to the cell or serving node and is not expected to be changed that often. The codebook parameters may also be signaled in a more dynamic fashion. For instance, the signaling can be comprised in a control information message, such as a Downlink Control information (DCI) message transmitted on a Physical Downlink Control Channel (PDCCH). As one example, the DCI could include an Uplink Grant for transmission of a CSI feedback report, where the codebook to use for calculating the CSI report is indicated in the Uplink Grant.

In some cases, a set of codebook parameters may be signaled to the UE in a semi-static fashion, such as via RRC signaling, and the selection of which one of the set of codebook parameters to use may be signaled in a more dynamic fashion. Further, the codebook parameters may also be signaled in a medium access control (MAC) Control Element (MAC CE) or in a MAC header. Anyhow, regardless of how the codebook parameters are signaled, the UE is able to determine which codebook to use based on the codebook parameters.

The UE is then explicitly or implicitly instructed to report CSI feedback using the determined codebook. The UE may, for instance, be configured with periodic CSI reporting, meaning that a CSI report should be transmitted periodically with a fixed periodicity. The UE may also, for instance, be configured with aperiodic CSI reporting, meaning that CSI is only reported when the gNB sends a CSI request in DCI. Anyhow, in order to report CSI feedback, the gNB must first transmit a set of CSI-RS from the multiple antenna panels, where each CSI-RS in the set is transmitted from an antenna port. In some embodiments, the set of CSI-RS belong to the same CSI-RS resource, while in other embodiments, CSI-RS transmitted from different antenna panels belong to different CSI-RS resources. In some further embodiments, the several CSI-RS resources is transmitted per panel and the UE first performs a selection of the preferred CSI-RS resource for each panel (for instance by feeding back a CSI-RS Resource Indication (CRI) for each panel).

Based on the CSI-RS measurements, the UE can select one or more precoder matrix from the determined precoder codebook that results in the best achievable throughput, and transmit one or more precoder matrix indicators, PMIs, back to the gNB.

In more detail, multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The NR standard is currently being specified. A core component in NR is the support of MIMO antenna deployments and MIMO related techniques. It is expected that NR will support up to 8- or 16-layer spatial multiplexing for up to 32 or 64 antenna ports with channel dependent precoding. The spatial multiplexing mode is aimed for high data rates in favorable channel conditions. An illustration of the spatial multiplexing operation is provided in FIG. 8.

As seen, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

NR uses OFDM in the downlink (and OFDM or DFT precoded OFDM in the uplink) and hence the received $N_R \times 1$ vector $y_n$ for a certain TFRE on subcarrier n (or alternatively data TFRE number n) is thus modeled by $$y_n = H_n W s_n + e_n \qquad \text{Equation 1}$$

where $e_n$ is a noise/interference vector obtained as realizations of a random process. The precoder W can be a wideband precoder, which is constant over frequency, or frequency selective.

The precoder matrix W is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the UE. In addition, the precoder matrix (or simply "precoder") may also be selected to strive for orthogonalizing the channel, meaning that after proper linear equalization at the UE, the inter-layer interference is reduced.

One example method for a UE to select a precoder matrix W can be to select the $W_k$ that maximizes the Frobenius norm of the hypothesized equivalent channel:

$$\max_k \left\| \hat{H}_n W_k \right\|_F^2 \qquad \text{Equation 2}$$

where
 $\hat{H}_n$ is a channel estimate, possibly derived from CSI-RS as described in Section 0 below.
 $W_k$ is a hypothesized precoder matrix with index k.
 $\hat{H}_n W_k$ is the hypothesized equivalent channel In closed-loop precoding for the NR downlink, the UE transmits, based on channel measurements in the forward link (downlink), recommendations to the gNodeB of a suitable precoder to use. The gNodeB configures the UE to provide feedback according to the UE's transmission mode, and may transmit CSI-RS and configure the UE to use measurements of CSI-RS to feed back recommended precoding matrices that the UE selects from a codebook. A single precoder that is supposed to cover a large bandwidth (wideband precoding) may be fed back. It may also be beneficial to match the frequency variations of the channel and instead feed back a frequency-selective precoding report, e.g. several precoders, one per subband. This is an example of the more general case of channel state information (CSI) feedback, which also encompasses feeding back other information than recommended precoders to assist the eNodeB in subsequent transmissions to the UE. Such other information may include channel quality indicators (CQIs) as well as transmission rank indicator (RI).

Given the CSI feedback from the UE, the gNodeB determines the transmission parameters it wishes to use to transmit to the UE, including the precoding matrix, transmission rank, and modulation and coding state (MCS). These transmission parameters may differ from the recommendations the UE makes. Therefore a rank indicator and MCS may be signaled in downlink control information (DCI), and the precoding matrix can be signaled in DCI or the gNodeB can transmit a demodulation reference signal from which the equivalent channel can be measured. The transmission rank, and thus the number of spatially multiplexed layers, is reflected in the number of columns of the precoder W. For efficient performance, it is important that a transmission rank that matches the channel properties is selected.

Channel State Information Reference Symbols (CSI-RS)

In NR, there exists a reference symbol sequence for the intent to estimate downlink channel state information, the CSI-RS. By measuring a CSI-RS transmitted from the gNodeB, a UE can estimate the effective channel the CSI-RS is traversing including the radio propagation channel and antenna gains. In more mathematical rigor this implies that if a known CSI-RS signal x is transmitted, a UE can estimate the coupling between the transmitted signal and the received signal (i.e., the effective channel). Hence if no virtualization is performed in the transmission, the received signal $y$ can be expressed as $$y = Hx + e \qquad \text{Equation 3}$$

and the UE can estimate the effective channel H.

Up to 32 or 64 CSI-RS ports can be configured in NR, that is, the UE can estimate the channel from up to 32 or 64 transmit antenna ports.

Based on a specified CSI-RS resource and on an interference measurement configuration (e.g. a zero-power CSI-RS resource), the UE can estimate the effective channel and noise plus interference, and consequently also determine the rank, precoding matrix, and MCS to recommend to best match the particular channel.

2D (Single-Panel) Antenna Arrays

Multi-antenna transmission in NR is generally envisioned to be used with two dimensional antenna arrays. Such antenna arrays may be (partly) described by the number of antenna columns corresponding to the horizontal dimension N, the number of antenna rows corresponding to the vertical dimension M and the number of dimensions corresponding to different polarizations P, with e.g. P=2 for dual polarized antenna elements (e.g. cross-polarized antenna elements). The total number of antennas is thus $N_{antennas}$=NMP. It should be pointed out that the concept of an antenna is non-limiting in the sense that it can refer to any virtualization (e.g., linear mapping) of the physical antenna elements. For example, pairs of physical sub-elements could be fed the same signal, and hence share the same virtualized antenna port.

In FIG. 9, an N×M array with N horizontal antenna elements 900 and M vertical antenna elements 900 is shown for an example of 4×4 cross-polarized (P=2) antenna elements.

Precoding may be interpreted as multiplying the signal with different beamforming weights for each antenna prior to transmission. A typical approach is to tailor the precoder to the antenna form factor, i.e. taking into account N, M and P when designing the precoder codebook.

Multi-Panel Antenna Arrays

When building very large antenna arrays, it can be challenging to fit in all the hardware components into a single antenna panel. One building practice is to use a modular approach and construct a, so called, multi-panel antenna array consisting of multiple antenna panels (as defined in the previous section). In the general case, the spacing between the right-most antenna element of a first panel and the left-most antenna element of a second panel placed to the right of the first panel can be larger than the spacing between antenna elements within a panel, corresponding to a non-uniform multi-panel array. It is generally assumed that the tight calibration required for seamless coherent transmission between antenna elements is only done within each panel, and so, different panels of the multi-panel array can be uncalibrated. There may thus exist a frequency offset, timing misalignment, and a LO phase offset between the panels.

A multi-panel array can, for example, be parametrized in the number of vertical panels $M_g$, the number of horizontal panels $N_g$ and size of the constituent panels M, N, P. An example of a multi-panel antenna array with $M_g$=2, $N_g$=2 and P=2, thus resulting in 4 panels 00, 01, 10 and 11 is given in FIG. 10. Each panel may be an N×M array, e.g. a 4×4 array with cross polarized antenna elements as shown in FIG. 9.

DFT-Based Precoders

A common type of precoding is to use a DFT precoder, where the precoder vector used to precode a single-layer transmission using a single-polarized uniform linear array (ULA) with $N_1$ antennas is defined as $$w_{1D}(l, N_1, O_1) = \frac{1}{\sqrt{N_1}} \begin{bmatrix} e^{j2\pi \cdot 0 \cdot \frac{l}{O_1 N_1}} \\ e^{j2\pi \cdot 1 \cdot \frac{l}{O_1 N_1}} \\ \vdots \\ e^{j2\pi \cdot (N_1-1) \cdot \frac{l}{O_1 N_1}} \end{bmatrix} \qquad \text{Equation 4}$$

where l=0, 1, . . . $O_1 N_1$−1 is the precoder index and $O_1$ is an integer oversampling factor. A precoder for a dual-polarized uniform linear array (ULA) with $N_1$ antennas per polarization (and so $2N_1$ antennas in total) can be similarly defined as $$w_{1D,DP}(l, N_1, O_1) = \begin{bmatrix} w_{1D}(l) \\ e^{j\phi} w_{1D}(l) \end{bmatrix} = \begin{bmatrix} w_{1D}(l) & 0 \\ 0 & w_{1D}(l) \end{bmatrix} \begin{bmatrix} 1 \\ e^{j\phi} \end{bmatrix} \qquad \text{Equation 5}$$

where $e^{j\phi}$ is a co-phasing factor between the two polarizations that may for instance be selected from a QPSK alphabet $$\phi \in \left\{ 0, \frac{\pi}{2}, \pi, \frac{3\pi}{2} \right\}.$$

A corresponding precoder vector for a two-dimensional uniform planar arrays (UPA) with $N_1 \times N_2$ antennas can be created by taking the Kronecker product of two precoder vectors as $w_{2D}(l,m) = w_{1D}(l,N_1,O_1) \otimes w_{1D}(m,N_2,O_2)$, where $O_2$ is an integer oversampling factor in the $N_2$ dimension. Each precoder $w_{2D}(l,m)$ forms a DFT beam, all the precoders $\{w_{2D}(l,m), l=0, \ldots, N_1O_1-1; m=0, \ldots, N_2O_2-1\}$ form a grid of DFT beams. An example is shown in FIG. 11, wherein $(N_1,N_2)=(4,2)$, $O_1=4$ and $O_2=4$, resulting in a $(N_1O_1,N_2O_2)=(16,8)$ grid with 16 beams in a first or "l-dimension" and 8 beams in a second or "m-dimension". Each beam thus may by be characterized by a pair of dimension parameters l and m. Beams with $(l,m)=(0,0), (4,0), (8,0), (12,0), (0,4), (4,4), (8,4), (12,4)$ form orthogonal DFT beams 110, whereas all the other beams form oversampled beams 111. By way of example, DFT beam 112 with $l=2, m=1$ corresponds to precoder $w_{2D}(l=2, m=1)$.

Throughout the following sections, the terms DFT beams' and DFT precoders' are used interchangeably.

More generally, a beam with an index pair (l,m) can be identified by the direction in which the greatest energy is transmitted when precoding weights $w_{2D}(l,m)$ are used in the transmission. Also, a magnitude taper can be used with DFT beams to lower the beam's sidelobes. A 1D DFT precoder along $N_1$ and $N_2$ dimensions with magnitude tapering can be expressed as $$W_{1D}(l, N_1, O_1, \beta) = \frac{1}{\sqrt{N_1}} \begin{bmatrix} \beta_0 e^{j2\pi \cdot 0 \cdot \frac{l}{O_1 N_1}} \\ \beta_1 e^{j2\pi \cdot 1 \cdot \frac{l}{O_1 N_1}} \\ \vdots \\ \beta_{N_1-1} e^{j2\pi \cdot (N_1-1) \cdot \frac{l}{O_1 N_1}} \end{bmatrix},$$

$$W_{1D}(m, N_2, O_2, \gamma) = \frac{1}{\sqrt{N_2}} \begin{bmatrix} \gamma_0 e^{j2\pi \cdot 0 \cdot \frac{m}{O_2 N_2}} \\ \gamma_1 e^{j2\pi \cdot 1 \cdot \frac{m}{O_2 N_2}} \\ \vdots \\ \gamma_{N_2-1} e^{j2\pi \cdot (N_2-1) \cdot \frac{m}{O_2 N_2}} \end{bmatrix}$$

Where $0 < \beta_i, \gamma_k \leq 1$ ($i=0, 1, \ldots, N_1-1; k=0, 1, \ldots, N_2-1$) are amplitude scaling factors. $\beta_i=1, \gamma_k=1$ ($i=0, 1, \ldots, N_1-1; k=0, 1, \ldots, N_2-1$) correspond to no tapering. DFT beams (with or without a magnitude taper) have a linear phase shift between elements along each of the two dimensions. Without loss of generality, we assume that the elements of $w(l,m)$ are ordered according to $w(l,m) = w_{1D}(l,N_1,O_1,\beta) \otimes w_{1D}(m,N_2,O_2,\gamma)$ such that adjacent elements correspond to adjacent antenna elements along dimension $N_2$, and elements of $w(l,m)$ spaced $N_2$ apart correspond to adjacent antenna elements along dimension $N_1$. Then the phase shift between two elements $w_{s_1}(l,m)$ and $w_{s_2}(l,m)$ of $w(l,m)$ can be expressed as:

$$w_{s_2}(l,m) = w_{s_1}(l,m) \cdot \left(\frac{\alpha_{s_2}}{\alpha_{s_1}}\right) \cdot e^{j2\pi((k_1-i_1)\Delta_1 + (k_2-i_2)\Delta_2)}$$

Where $s_1 = i_1 N_2 + i_2$ $s_2 = k_1 N_2 + k_2$ (With $0 \leq i_2 < N_2$, $0 \leq N_1$, $0 \leq k_2 < N_2$, and $0 \leq k_1 < N_1$) are integers identifying two entries of the beam $w(l,m)$ so that $(i_1,i_2)$ indicates to a first entry of beam $w(l,m)$ that is mapped to a first antenna element (or port) and $(k_1,k_2)$ indicates to a second entry of beam $w(l,m)$ that is mapped to a second antenna element (or port).

$\alpha_{s_1} = \beta_{i_1} \gamma_{i_2}$ and $\alpha_{s_2} = \beta_{k_1} \gamma_{k_2}$ are real numbers. $\alpha_i \neq 1$ ($i=s_1,s_2$) if magnitude tapering is used; otherwise $\alpha_i = 1$.

$$\Delta_1 = \frac{l}{O_1 N_1}$$

is a phase shift corresponding to a direction along an axis, e.g. the horizontal axis ('azimuth')

$$\Delta_2 = \frac{m}{O_2 N_2}$$

is a phase shift corresponding to direction along an axis, e.g. the vertical axis ('elevation')

Therefore a $k^{th}$ beam $d(k)$ formed with precoder $w(l_k,m_k)$ can also be referred to by the corresponding precoder $w(l_k,m_k)$, i.e. $d(k) = w(l_k,m_k)$. Thus a beam $d(k)$ can be described as a set of complex numbers, each element of the set being characterized by at least one complex phase shift such that an element of the beam is related to any other element of the beam where $d_n(k) = d_i(k)\alpha_{i,n} e^{j2\pi(p\Delta_{1,k} + q\Delta_{2,k})} = d_i(k)\alpha_{i,n}(e^{j2\pi\Delta_{1,k}})^p (e^{j2\pi\Delta_{2,k}})^q$, where $d_i(k)$ is the $i^{th}$ element of a beam $d(k)$, $\alpha_{i,n}$ is a real number corresponding to the $i^{th}$ and $n^{th}$ elements of the beam $d(k)$; p and q are integers; and $\Delta_{1,k}$ and $\Delta_{2,k}$ are real numbers corresponding to a beam with index pair $(l_k,m_k)$ that determine the complex phase shifts $e^{j2\pi\Delta_{1,k}}$ and $e^{j2\pi\Delta_{2,k}}$, respectively. Index pair $(l_k,m_k)$ corresponds to a direction of arrival or departure of a plane wave when beam $d(k)$ is used for transmission or reception in a UPA or ULA. A beam $d(k)$ can be identified with a single index k where $= l_k + N_1 O_1 m_k$, i.e. along vertical or $N_2$ dimension first, or alternatively $k = N_2 O_2 l_k + m_k$, i.e. along horizontal or $N_1$ dimension first.

Extending the precoder for a dual-polarized ULA may then be done as $$W_{2D,DP}(l, m, \phi) = \begin{bmatrix} 1 \\ e^{j\phi} \end{bmatrix} \otimes w_{2D}(l, m) = \begin{bmatrix} w_{2D}(l, m) \\ e^{j\phi} w_{2D}(l, m) \end{bmatrix} = \begin{bmatrix} w_{2D}(l, m) & 0 \\ 0 & w_{2D}(l, m) \end{bmatrix} \begin{bmatrix} 1 \\ e^{j\phi} \end{bmatrix} \quad \text{Equation 6}$$

A precoder matrix $W_{2D,DP}$ for multi-layer transmission may be created by appending columns of DFT precoder vectors as $$W_{2D,DP}^{(R)} = [w_{2D,DP}(l_1,m_1,\phi_1) w_{2D,DP}(l_2,m_2,\phi_2) \ldots w_{2D,DP}(l_R,m_R,\phi_R)]$$

where R is the number of transmission layers, i.e. the transmission rank. In a special case for a rank-2 DFT precoder, $m_1 = m_2 = m$ and $l_1 = l_2 = l$, we have $$W^{(2)}_{2D,DP}(l, m, \phi_1, \phi_2) = [w_{2D,DP}(l, m, \phi_1)\ w_{2D,DP}(l, m, \phi_2)] \quad \text{Equation 7}$$

$$= \begin{bmatrix} w_{2D}(l, m) & 0 \\ 0 & w_{2D}(l, m) \end{bmatrix} \begin{bmatrix} 1 & 1 \\ e^{j\phi_1} & e^{j\phi_2} \end{bmatrix}$$

For each rank, all the precoder candidates form a 'precoder codebook' or a 'codebook'. A UE can first determine the rank of the estimated downlink wideband channel based CSI-RS. After the rank is identified, for each subband the UE then searches through all the precoder candidates in a codebook for the determined rank to find the best precoder for the subband. For example, in case of rank=1, the UE would search through $w_{2D,DP}(k,l,\phi)$ for all the possible $(k,l,\phi)$ values. In case of rank=2, the UE would search through $W^{(2)}_{2D,DP}(k,l,\phi_1,\phi_2)$ for all the possible $(k,l,\phi_1,\phi_2)$ values.

Typically, the required frequency granularity of the selection of the DFT beam direction and the polarization co-phasing are different, the DFT beam can typically be selected once for the entire bandwidth while the polarization co-phasing can benefit from per-subband selection. A typical approach is thus to split up the DFT beam selection and polarization co-phasing in separate matrix factors as below:

$$W^{(2)}_{2D,DP}(l, m, \phi_1, \phi_2) = \begin{bmatrix} w_{2D}(l, m) & 0 \\ 0 & w_{2D}(l, m) \end{bmatrix} \begin{bmatrix} 1 & 1 \\ e^{j\phi_1} & e^{j\phi_2} \end{bmatrix} = W_1 W_2 \quad \text{Equation 8}$$

The $W_1$ matrix factor can then be reported once for the entire bandwidth while the $W_2$ matrix factor can be reported on a subband basis.

Notation, Assumptions, and Scope

For ease of explanation in the following, it will be assumed that $M_g=N_g=2$, resulting in 4 antenna panels 1010, 1020, 1030 and 1040, as is illustrated in FIG. 10. It should be noted that some embodiments are applicable to any number of antenna panels larger than one, and that the number and spatial distribution of panels used in the embodiments herein is merely one example.

Assume also in the following that the antenna elements of the panel array are indexed with $$i = M_g PNM \cdot r_V + PNM \cdot r_H + NM \cdot p + M \cdot n + m,$$

where $r_V = 0, \ldots, M_g-1$ is the vertical panel index, $r_H = 0, \ldots, N_g-1$ is the horizontal panel index, $m=0, \ldots, M-1$ is the vertical antenna port index within a panel, $n=0, \ldots, N-1$ is the horizontal antenna port index within a panel and $p=0,1$ is the polarization index. That is, the multi-panel precoding matrix $W_{MP}$ is constructed by stacking the precoding matrices for the constituent panels $W_{P00}$, $W_{P10}$, $W_{P01}$, $W_{P11}$ so that $$W_{MP} = \begin{bmatrix} W_{P00} \\ W_{P10} \\ W_{P01} \\ W_{P11} \end{bmatrix}.$$

Note that this is just one example of how the antenna ports may be ordered. Different embodiments may of course utilize a different antenna ordering.

In the following, the Kronecker product will be used. The Kronecker product $A \otimes B$ between two matrices $$A = \begin{bmatrix} A_{1,1} & \cdots & A_{1,M} \\ \vdots & \ddots & \vdots \\ A_{N,1} & \cdots & A_{N,M} \end{bmatrix}$$

and B is defined as $$A \otimes B = \begin{bmatrix} A_{1,1}B & \cdots & A_{1,M}B \\ \vdots & \ddots & \vdots \\ A_{N,1}B & \cdots & A_{N,M}B \end{bmatrix},$$

i.e. the matrix B is multiplied to each element of A. The Kronecker product rule $(A \otimes B)(C \otimes D) = (AC) \otimes (BD)$ is a useful mathematical property for rewriting matrix expressions which is used extensively hereinafter. Further, the notation $I_K$ will denote a size K×K identity matrix.

Motivation for Design of Codebook for Coherent Multi-Panel Transmission

A DFT precoder codebook, such as that described in the background section, comprises precoder vectors with linearly increasing phases over the antenna ports in each spatial dimension. Such a codebook design implicitly assumes an antenna setup of phase-calibrated and equally spaced antenna ports in each dimension. In this case, the codebook perfectly matches the array response assuming a pure line-of-sight channel and gives a good representation of the dominant channel path for other propagation conditions. In the case of an uncalibrated multi-panel array, and/or, a non-uniform multi-panel array, the implicit assumptions of the DFT codebook are thus broken. That is, applying a DFT precoder across antenna elements of the multiple panels may not result in an efficient representation of the channel response. This is due to several factors.

First, the spacing between the last antenna element of a panel and the first antenna element of the next panel is different from the antenna element spacing within a panel for a non-uniform panel array. Thus, the phase shift between said antenna elements would have to be $$e^{\frac{j2\pi k(1+\Delta_{panel})}{N}}$$

rather than $$e^{\frac{j2\pi k}{N}}$$

(as it is for the DFT precoder) in order to create a linear phase front, where k is the DFT precoder index, N the number of antennas in a dimension and $\Delta_{panel}$ the additional distance between panels compared to the distance between panels in a uniform multi-panel array. This phase difference could of course be compensated directly for in the codebook if the panel distance was known, however, the distance between panels is up to implementation and not known in the general case.

Second, there may exist an additional phase offset between panels due to, for instance, different LO phase state. In the worst case, the phase offset may be completely random and thus uniformly distributed in $[0,2\pi]$.

Third, if the antenna panels have a timing misalignment, this may introduce a frequency-selective phase offset.

A codebook for coherent multi-panel transmission should thus compensate for these phase offsets.

Codebook Design for Coherent Multi-Panel Transmission

In this section, codebook designs for coherent multi-panel transmission are presented. The intent of the codebook design is to compensate for the phase offsets discussed in the previous section. Generally speaking, the inter-panel phase offset compensation may be described by a length-$M_g N_g$ vector $$w_{PANEL} = \begin{bmatrix} 1 \\ e^{j\alpha_{10}} \\ e^{j\alpha_{01}} \\ e^{j\alpha_{11}} \end{bmatrix},$$

where $$e^{j\alpha_{r_V r_H}}$$

is the phase compensation for panel $(r_V, r_H)$. The phase compensation factors for an antenna panel should be applied to all the antenna ports corresponding to that panel.

For the precoding within the antenna panel, a DFT type precoder may be used, e.g.

$$\begin{bmatrix} w_{2D}(l,m) & 0 \\ 0 & w_{2D}(l,m) \end{bmatrix} \begin{bmatrix} 1 \\ e^{j\phi} \end{bmatrix} = W_1 W_2$$

for a rank-1 precoder matrix.

In some embodiments, the antenna panels are co-located, and so, the propagation characteristics between the UE and each antenna panel may be assumed to be similar, and thus, the same selection of per-panel precoder can be assumed to be optimal. In that case, the multi-panel precoder matrix may be expressed as $$W_{MP} = w_{PANEL} \otimes (W_1 W_2) = \begin{bmatrix} W_1 W_2 \\ e^{j\alpha_{10}} W_1 W_2 \\ e^{j\alpha_{01}} W_1 W_2 \\ e^{j\alpha_{11}} W_1 W_2 \end{bmatrix}$$

where $\otimes$ denotes the Kronecker product between to matrices. As seen, this precoder structure applies the per-panel precoder $W_1 W_2$ to each of the four (in this example) antenna panels and applies a phase scaling $$e^{j\alpha_{r_V R_H}}$$

to all the antenna ports of panel $(r_V, r_H)$, as was desired. The expression can be mathematically rewritten into a series of matrix multiplications instead of a Kronecker product as $$W_{MP} = w_{PANEL} \otimes (W_1 W_2) = \underbrace{(w_{PANEL} \otimes I_{2MN})}_{\triangleq W_3} W_1 W_2 = W_3 W_1 W_2.$$

This form is more convenient to work with. The resulting precoder matrix can thus be factorized into three matrix factors:

$W_3$: Comprises co-phasing of the antenna panels
$W_1$: Comprises DFT precoding within each antenna panel
$W_2$: Comprises polarization co-phasing within each panel The feedback of the selection of each matrix factor may comprise transmitting a separate PMI for each matrix factor. It may also comprise jointly encoding the selection of all matrix factors into a single PMI. In some embodiments, several precoder matrices will be selected. For instance, a separate selection may be done for each subband in the frequency domain. In that case, several PMIs indicating all the selected matrices may be comprised a CSI feedback report.

In some embodiments, the $W_3$ matrix factor is selected with a wideband frequency-granularity. This is applicable when the antennas are fairly well-calibrated so that no timing misalignment exists between panels. In other embodiments, the $W_3$ matrix factor is instead selected with a subband frequency granularity. This is appropriate if there exists a timing misalignment between antenna panels that needs to be compensated for.

In some embodiments, the antenna panels may be physically separated from each-other or rotated in different directions. In that case, it may not be beneficial to use the same per-panel precoder. Instead, a separate per-panel precoder(s) $W_1^{00} W_2^{00}$, $W_1^{10} W_2^{10}$, ... are used for each panel, so that the multi-panel precoder may be expressed as $$W_{MP} = \begin{bmatrix} W_1^{00} W_2^{00} \\ e^{j\alpha_{10}} W_1^{10} W_2^{10} \\ e^{j\alpha_{01}} W_1^{01} W_2^{01} \\ e^{j\alpha_{11}} W_1^{11} W_2^{11} \end{bmatrix}.$$

Changing Order of the Matrix Factors

It is noted that one may rewrite the matrix expression in order to change the order of the "inter-panel co-phasing matrix factor", "per-panel DFT precoding matrix factor" and "polarization co-phasing matrix factor". Embodiments herein contemplate any such rewriting of the matrix factor order. Some example embodiments are given below.

In some embodiments, the precoder matrix expression is rewritten to have the per-panel DFT precoding matrix factor as the first matrix, such as:

$$W_{MP} = w_{PANEL} \otimes (W_1 W_2) =$$

$$w_{PANEL} \otimes \left( \begin{bmatrix} w_{2D} & 0 \\ 0 & w_{2D} \end{bmatrix} W_2 \right) = w_{PANEL} \otimes ((I_2 \otimes w_{2D}) W_2) =$$

$$w_{PANEL} \otimes ((I_2 \otimes w_{2D})(W_2 \otimes 1)) = w_{PANEL} \otimes (W_2 \otimes w_{2D}) =$$

$$(w_{PANEL} \otimes W_2) \otimes w_{2D} == (I_{2 N_g M_g} \cdot (w_{PANEL} \otimes W_2)) \otimes (w_{2D} \cdot 1) =$$

$$(I_{2 N_g M_g} \otimes w_{2D}) \cdot (w_{PANEL} \otimes W_2) = \widetilde{W}_1 \cdot (w_{PANEL} \otimes W_2),$$

where $\widetilde{W}_1 = I_{2 N_g M_g} \otimes w_{2D}$ is a per-panel DFT precoding matrix factor.

In one such embodiment, the expression is rewritten so that the inter-panel co-phasing matrix factor is the middle matrix factor as $$W_{MP} = \tilde{W}_1 \cdot (w_{PANEL} \otimes W_2) =$$

$$\tilde{W}_1 \cdot ((w_{PANEL} \cdot 1) \otimes (I_2 \cdot W_2)) = \tilde{W}_1(w_{PANEL} \otimes I_2)W_2 = \tilde{W}_1 \tilde{W}_3 W_2,$$

where $\widetilde{W}_3 = w_{PANEL} \otimes I_2$ is an inter-panel co-phasing matrix factor.

In another such embodiment, the inter-panel co-phasing matrix factor is instead the last matrix factor as $$W_{MP} = \tilde{W}_1 \cdot (w_{PANEL} \otimes W_2) = \tilde{W}_1 \cdot \left((I_{N_g M_g} \cdot w_{PANEL}) \otimes (W_2 \cdot I_R)\right) =$$

$$\tilde{W}_1(I_{N_g M_g} \otimes W_2)(w_{PANEL} \otimes I_R) = \tilde{W}_1 \tilde{W}_2 \tilde{\tilde{W}}_3,$$

where $\widetilde{W}_2$ is a per-panel polarization co-phasing matrix factor and $\widetilde{\widetilde{W}}_3$ is an inter-panel co-phasing matrix factor and R is the precoder rank.

A person skilled in the art may appreciate that the disclosed technique of rewriting the precoder expression so that the order between the different types of matrix factors is exchanged can be applied to create an arbitrary order of the matrix factors, and so, the embodiments herein are applicable to any ordering of said matrix factors.

In yet another embodiment, the $$W_{MP} = \widetilde{W}_1 \cdot (w_{PANEL} \otimes W_2) = \widetilde{W}_1 \widetilde{W}_{23}$$

where $\widetilde{W}_{23} = (w_{PANEL} \otimes W_2)$ is a combined inter-panel and per-panel polarization co-phasing matrix factor. For instance, such a combined matrix may have the structure:

$$\tilde{W}_{23} = (w_{PANEL} \otimes W_2) = \begin{bmatrix} 1 & 1 \\ e^{j\phi} & -e^{j\phi} \\ e^{j\alpha_{10}} & e^{j\alpha_{10}} \\ e^{j\alpha_{10}}e^{j\phi} & -e^{j\alpha_{10}}e^{j\phi} \\ e^{j\alpha_{01}} & e^{j\alpha_{01}} \\ e^{j\alpha_{01}}e^{j\phi} & -e^{j\alpha_{01}}e^{j\phi} \\ e^{j\alpha_{11}} & e^{j\alpha_{11}} \\ e^{j\alpha_{11}}e^{j\phi} & -e^{j\alpha_{11}}e^{j\phi} \end{bmatrix}$$

Such a combination of the two matrix types may be beneficial if $\widetilde{W}_1$ is selected with a wideband frequency-granularity while the other two matrices are selected per subband. By combining the two matrix factors into one matrix factor, the PMI selection can be jointly encoded over the two factors which may reduce the PMI reporting overhead.

In a variation of this embodiment, separate inter-panel co-phasing coefficients are used for each transmitted layer, so that the combined per-panel may have the structure $$\tilde{W}_{23} = (w_{PANEL} \otimes W_2) = \begin{bmatrix} 1 & 1 \\ e^{j\phi} & -e^{j\phi} \\ e^{j\alpha_{10}} & e^{j\beta_{10}} \\ e^{j\alpha_{10}}e^{j\phi} & -e^{j\beta_{10}}e^{j\phi} \\ e^{j\alpha_{01}} & e^{j\alpha_{01}} \\ e^{j\alpha_{01}}e^{j\phi} & -e^{j\beta_{01}}e^{j\phi} \\ e^{j\alpha_{11}} & e^{j\alpha_{11}} \\ e^{j\alpha_{11}}e^{j\phi} & -e^{j\beta_{11}}e^{j\phi} \end{bmatrix},$$

where the $$e^{j\alpha_{r_V r_H}}$$

is the inter-panel co-phasing factor for panel $(r_V, r_H)$ for the first layer and $$e^{j\beta_{r_V r_H}}$$

is the inter-panel co-phasing factor for panel $(r_V, r_H)$ for the second layer.

Analogue Beamforming Embodiments

The previously discussed embodiments are appropriate when each panel uses sufficiently many antenna ports, such as when a digital panel implementation is used. However, if for instance an analogue panel implementation is used instead, the number of antenna ports per panel may be small. In that case, it may not be necessary to use a DFT precoder within the panel (as the precoding across antenna elements of the same polarization in the panel is typically done in a UE transparent way when an analogue implementation is used, and thus, it may not have to be included in the codebook). Thus, in some embodiments, the multi-panel precoder matrix consists of only two matrix factor, as $$W_{MP} = w_{PANEL} \otimes (W_2) = \underbrace{(w_{PANEL} \otimes I_2)}_{\triangleq W_3} W_2 = W_3 W_2.$$

It should be noted that the previously disclosed embodiments (comprising three matrix factors) can be combined with this embodiments as well, when applicable.

Details of Inter-Panel Co-Phasing Matrix Factor

The next section contains embodiments for how the inter-panel co-phasing matrix factor $w_{PANEL}/W_3$ is selected.

In one embodiment, each co-phasing factor $$e^{j\alpha_{r_V R_H}}$$

is selected independently of the other co-phasing factors for the other panels, so called scalar quantization. For instance, $$e^{j\alpha_{r_V R_H}}$$

may be selected from one of the following sets: {1, −1}, or {1, j, −1, −j}, corresponding to a B-PSK and Q-PSK constellation. In a more general embodiment, the co-phasing factors may be selected from a $2^K$-PSK constellation, i.e. comprising the values $$\left\{1, e^{j2\pi \cdot \frac{1}{K}}, e^{j2\pi \cdot \frac{2}{K}}, \ldots, e^{j2\pi \cdot \frac{K-1}{K}}\right\}. \quad 5$$

In another embodiment, vector quantization is used to select the inter-panel co-phasing. That is, $w_{PANEL}$ is selected from a set of possible vectors $w_{PANEL} \in \{w_A, w_B, \ldots\}$, i.e. $w_{PANEL}$ is selected from an inter-panel codebook.

In one embodiment, applicable for only 4 antenna panels, the LTE 4TX Rel-8 Householder rank-1 codebook (from 3GPP TS 36.211 Rel-8) is used as the inter-panel codebook. That is $w_{PANEL}$ may be selected from the 16 possible values of $W_n^{\{1\}}$, which is defined as:

"The quantity $W_n^{\{s\}}$ denotes the matrix defined by the columns given by the set $\{S\}$ from the expression $W_n = I - 2u_n u_n^H / u_n^H u_n$ where I is the 4×4 identity matrix and the vector $u_n$ is given by Table 1"

TABLE 1

Definition of 4TX codebook from 3GPP TS 36.211

| | | Number of layers $\upsilon$ | | | |
|---|---|---|---|---|---|
| Codebook index | $u_n$ | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+J)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In another, similar, embodiment, the set of vectors $u_n$, n=0, 1, ..., 15 as defined in Table 1 is used as the inter-panel codebook. That is, the Householder transformation is not applied as we are only interested in rank-1 vectors anyway.

In another embodiment, applicable to 3 antenna panels, the inter-panel codebook (comprising length-3 vectors) is generated by taking the precoders from the LTE 4TX Rel-8 Householder codebook and removing one of the elements in each precoder (for instance removing the fourth row).

In another embodiment, a DFT precoder codebook is used for the inter-panel codebook.

Codebook Design for Non-Coherent Multi-Panel Transmission

For non-coherent transmission between panels, antenna ports corresponding to different panels are not coherently combined to form the transmission of a single layer. Instead, different layers are transmitted from each panel. This relaxes the requirement of synchronization between panels, and so, allows for a less complex implementation.

A codebook for non-coherent transmission between panels can then be expressed as a block-diagonal matrix (where the blocks may be of different sizes depending on how many layers are transmitted from each panel):

$$\begin{bmatrix} w_{P00} \\ w_{P10} \\ w_{P01} \\ w_{P11} \end{bmatrix} = \begin{bmatrix} W_1^{00} & W_2^{00} & 0 & 0 & 0 \\ 0 & W_1^{10} & W_2^{10} & 0 & 0 \\ 0 & 0 & W_1^{01} & W_2^{01} & 0 \\ 0 & 0 & 0 & W_1^{11} & W_2^{11} \end{bmatrix} =$$

$$\text{diag}(W_1^{00} W_2^{00}, W_1^{10} W_2^{10}, W_1^{01} W_2^{01}, W_1^{11} W_2^{11}),$$

where $W_1^{r_V r_H} W_2^{r_V r_H}$ may be a DFT precoder. Note that in the above expression, all the antenna panels are transmitting, and the rank is thus at least as large as the number of panels (each panel may then transmit several layers). In another embodiment, a panel selection component is added to the precoder structure so that a subset of panels is selected in a first step:

$$\begin{bmatrix} W_{P00} \\ W_{P10} \\ W_{P01} \\ W_{P11} \end{bmatrix} = \left( \begin{bmatrix} i_{00} \\ i_{10} \\ i_{01} \\ i_{11} \end{bmatrix} \otimes I_{NM} \right) \cdot \begin{bmatrix} w_1^{00} & w_2^{00} & 0 & 0 & 0 \\ 0 & w_1^{10} & w_2^{10} & 0 & 0 \\ 0 & 0 & w_1^{01} & w_2^{01} & 0 \\ 0 & 0 & 0 & w_1^{11} & w_2^{11} \end{bmatrix},$$

where $i_{r_V r_H} \in \{1, 0\}$ controls if a panel is on or off.

In another embodiment, the precoder matrix is factorized into two matrix factors, where a first matrix factor comprises a set of orthogonal DFT beams that are common for all the antenna panels and the second matrix factor comprises per-panel precoding which may comprise DFT beam selection:

$$\begin{bmatrix} W_{P00} \\ W_{P10} \\ W_{P01} \\ W_{P11} \end{bmatrix} = (I_{N_g M_g} \otimes W_1) \begin{bmatrix} w_2^{00} & 0 & 0 & 0 \\ 0 & w_2^{10} & 0 & 0 \\ 0 & 0 & w_2^{01} & 0 \\ 0 & 0 & 0 & w_2^{11} \end{bmatrix}$$

where $W_1$ may for instance comprise two orthogonal DFT beams as $$W_1 = \begin{bmatrix} w_{2D}(l+O, m) & w_{2D}(l, m) & 0 & 0 \\ 0 & 0 & w_{2D}(l+O, m) & w_{2D}(l, m) \end{bmatrix}$$

where $O$ is an oversampling factor and $(l,m)$ is a 2D DFT beam index.

The $W_2$ matrix may then for instance comprise selection vectors, such as $$W_2 = \begin{bmatrix} e_k & e_k \\ e^{j\phi_1} e_k & e^{j\phi_2} e_k \end{bmatrix}$$

where $e_k$ is a selection vector which contains a 1 at row k and has zeros on all other rows.

Analogues Beamforming Embodiments

Similarly as for the coherent case, the non-coherent codebook may be used for analogue beamforming with a relatively small number of ports per panel as well. In this case, only two matrix factors may be needed and the resulting precoder matrix has the structure $$\begin{bmatrix} W_{P00} \\ W_{P10} \\ W_{P01} \\ W_{P11} \end{bmatrix} = \begin{bmatrix} w_2^{00} & 0 & 0 & 0 \\ 0 & w_2^{10} & 0 & 0 \\ 0 & 0 & w_2^{01} & 0 \\ 0 & 0 & 0 & w_2^{11} \end{bmatrix} = \text{diag}(w_2^{00}, w_2^{10}, w_2^{01}, w_2^{11}).$$

I.e. the "per-panel DFT precoder matrix factor", "W1", may be removed from the expression.

EXAMPLE EMBODIMENTS

1. A method performed by a UE for determining CSI feedback corresponding to transmission from multiple antenna panels of a transmitting network node, the method comprising:
   a. receiving, from the network node, a signaling of the antenna panel structure (i.e., a structural arrangement of the multiple antenna panels at the transmitting network node),
   b. determining a multi-panel precoder codebook based on the received signaling,
   c. measuring a set of CSI-RS corresponding to multiple antenna panels of the transmitting network node,
   d. selecting at least one precoder matrix from the multi-panel precoder codebook based on the measured set of CSI-RS, and
   e. transmitting at least one precoder matrix indication, PMI, indicating the selection of the at least one precoder matrix to the network node.
2. The method of embodiment 1, wherein the multi-panel precoder codebook comprises precoder matrices, that
   a. combines antenna ports corresponding to separate antenna panels onto the same layers [coherent multi-panel transmission], and or
   b. combines antenna ports corresponding to separate antenna panels onto separate layers [non-coherent multi-panel transmission].
3. The method of embodiment 2, where the multi-panel precoder codebook comprises precoder matrices comprising at least two matrix factors and wherein applying one "inter-panel" matrix factor comprises applying, for each antenna panel, a panel-specific complex weight to all antenna ports corresponding to that panel.
4. The method of embodiment 3, where another of the at least two matrix factors comprise a DFT precoder matrix factor applied to each antenna panel.
5. The method of embodiment 3, where the panel-specific complex weight is a phase shift.
6. The method of embodiment 3, where the inter-panel matrix factor is selected:
   a. on a wideband basis,
   b. on a per-subband basis.
7. The method of embodiment 1, where the received signaling of the antenna panel structure comprises one or more of:
   a. the number of antenna panels, $N_g M_g$
   b. the number of antenna panels in each dimension $N_g$, $M_g$
8. The method of embodiment 5, where the panel-specific phase shifts are selected independently per panel (scalar quantization) from a $\{B,Q,8\}$-PSK constellation.
9. The method of embodiment 5, where the panel-specific phase shifts are selected from a codebook that is:
   a. the LTE 4TX rank-1 Householder codebook,
   b. a subsampled and/or punctured LTE 4TX rank-1 Householder codebook, or
   c. a DFT codebook.
10. The method of embodiment 2, where the multi-panel precoder codebook comprises precoder matrices that concatenates independently selected per-panel precoders.
11. The method of embodiment 2, where the multi-panel precoder codebook comprises precoder matrices comprising at least two matrix factors and where a first matrix factor is common for panels while a second matrix factor comprise per-panel precoding.
12. The method of embodiment 1, where the measuring comprises measuring on one or more CSI-RS resource per antenna panel and selecting a preferred CSI-RS resource per panel and indicating the selection as part of the CSI feedback report.

The following section comprises further considerations for extension of Type I CSI feedback to support multi-panel operation.

A motivation for using multiple panels instead of a fitting all the antenna elements into a single calibrated panel is to decrease the implementation complexity. By its nature, multi-panel arrays are a suitable design when the gNB employs many antenna elements and TXRUs. Thus, the number of antenna elements per panel can be assumed to be large and thus require a large number antenna ports per panel. However, as only 32 antenna ports for coherent combining are agreed to be supported thus far in NR, it is questionable if a multi-panel implementation is warranted as this does not result in that many antenna ports per panel, and so, a single-panel implementation should suffice if coherent transmission is the intended scheme. However, if up to 64 antenna ports are supported, and/or non-coherent transmission is considered, a multi-panel implementation could be a viable alternative which would warrant explicit specification support.

Further, if antenna panels are uncalibrated with respect to carrier frequency or sampling clock timing, coherent transmission between panels may be unfeasible since not only will a phase and amplitude offset between panels be introduced after OFDM demodulation, ICI is introduced as well which limits the benefit of coherent transmission. While the resulting phase and amplitude scaling can be compensated for in a precoder codebook, the ICI cannot be mitigated without explicitly estimating the frequency and timing offset and compensating for them in the OFDM (de)modulation. Thus, for coherent multi-panel transmission to be beneficial, panels must be assumed to be well-enough calibrated (note, though, that a phase offset between panels will not introduce any ICI).

The default mode of operation for multi-panel arrays should thus be considered to be non-coherent joint transmission (JT) between the panels.

For non-coherent transmission between panels, antenna ports corresponding to different panels are not coherently combined to form the transmission of a single layer. Instead, the antenna ports of each panel are mapped to separate CSI-RS resources and different layers are transmitted from each panel. This relaxes the requirement of synchronization between panels, and so, allows for a less complex implementation.

From a UEs perspective, it should not fundamentally matter if the multiple layers in a non-coherent JT is transmitted from co-sited panels belonging to the same TRP or if they are transmitted from multiple TRPs on different physical locations. Thus, non-coherent transmission between panels should be handled in the same framework as non-coherent transmission between TRPs, as is further elaborated in.

Multi-Panel Codebook Design for Coherent Transmission:

A DFT precoder codebook, such as the LTE Class A codebooks, comprises precoder vectors with linearly increasing phases over the antenna ports in each spatial dimension. Such a codebook design implicitly assumes an antenna setup of phase-calibrated and equally spaced antenna ports in each dimension. In this case, the codebook perfectly matches the array response assuming a pure line-of-sight channel and gives a good representation of the dominant channel path for other propagation conditions. In the case of an uncalibrated multi-panel array, and/or, a non-uniform multi-panel array, the implicit assumptions of the DFT codebook are thus broken. That is, applying a LTE Class A type DFT precoder across antenna elements of the multiple panels may not result in an efficient representation of the channel response. This is due to several factors:

The spacing between the last antenna element of a panel and the first antenna element of the next panel is different from the antenna element spacing within a panel for a non-uniform panel array. Thus, the phase shift between said antenna elements would have to be $$e^{\frac{j2\pi k(1+\Delta_{panel})}{N}}$$

rather than $$e^{\frac{j2\pi k}{N}}$$

(as it is for the DFT precoder) in order to create a linear phase front, where k is the DFT precoder index, N the number of antennas in a dimension and $\Delta_{panel}$ the additional distance between panels compared to the distance between panels in a uniform multi-panel array. This phase difference could of course be compensated directly for in the codebook if the panel distance was known (thus avoiding the introduction of an additional codebook component), however, the distance between panels is up to implementation.

There may exist an additional phase offset between panels due to, for instance, different LO phase state or frequency offset. In the worst case, the phase offset may be completely random and thus uniformly distributed in [0, 2π].

If the antenna panels have a timing misalignment, this may introduce a frequency-selective phase offset.

We first note that first two phase offsets do not depend on frequency, and thus, the compensation may be done on a wideband basis. We then note that for Type I single-beam CSI feedback, the first phase offset need not be explicitly compensated for as the second phase offset anyway can be uniformly distributed in [0, 2π]. However, for Type II CSI feedback with beam combination, the first phase offset should be modelled explicitly since it is different for each beam and thus, a separate phase compensation factor for each beam and panel may be needed.

To compensate for a frequency-selective phase offset due to a possible timing misalignment, a per-subband co-phasing of antenna panels may be needed. This would however incur a large amount of overhead in comparison to the performance that can be expected. Essentially, one would pay the overhead for Type II feedback while only achieving Type I performance. In our view, this overhead is not warranted and any timing misalignment should be solved by gNB implementation rather than be incorporated in UE feedback.

As an observation, a wideband panel co-phasing can be used to compensate for non-uniform panel spacing and different LO phase state; a frequency-selective panel co-phasing is needed to compensate for timing misalignment between panels.

For the precoding within a panel, the same codebook as for the single-panel case should be used. That is, the regular "LTE Class A"-like codebook with W1W2 structure, where W1 comprises beam selection and W2 comprises polarization cophasing should be used. As the antenna panels should be co-located for coherent transmission, the panels should see the same propagation environment, and thus, the same selection of W1 and W2 should be optimal for all panels.

If the panel uses analogue beamforming rather than a digital implementation, a "LTE Class B"-like codebook with W2 only could be used as the per-panel codebook.

As a proposal:

a uniformly distributed wideband phase offset between panels should be compensated for in the coherent multi-panel codebook The precoding within a panel should use the single-panel codebook Frequency-selective panel cophasing is not supported Based on these proposals, we can design the coherent multi-panel codebook.

For ease of explanation, assume that $M_g=N_g=2$ so that 4 antenna panels are used, as is illustrated in Error! Reference source not found. Assume also in the following that the antenna elements of the panel array are indexed with $i = M_g PNM \cdot r_V + PNM \cdot r_V + NM \cdot p + M \cdot n + m,$ Where $r_V=0, \ldots, M_g-1$ is the vertical panel index, $r_H=0, \ldots, N_g-1$ is the horizontal panel index, $m=0, \ldots, M-1$ is the vertical antenna port index within a panel, $n=0, \ldots, N-1$ is the horizontal antenna port index within a panel and $p=0,1$ is the polarization index. That is, the multi-panel precoding matrix $W_{MP}$ is constructed by stacking the precoding matrices for the constituent panels $$w_{P00}, w_{P10}, w_{P01}, w_{P11} \text{ so that } W_{MP} = \begin{bmatrix} w_{P00} \\ w_{P10} \\ w_{P01} \\ w_{P11} \end{bmatrix}.$$

The inter-panel phase offset compensation can be described by the length-$M_g N_g$ vector $$w_{PANEL} = \begin{bmatrix} 1 \\ e^{j\alpha_{10}} \\ e^{j\alpha_{01}} \\ e^{j\alpha_{11}} \end{bmatrix},$$

where $e^{j\alpha_{r_V r_H}}$ is the phase compensation for panel $(r_V, r_H)$. Assuming the same selection of $W_1$ and $W_2$ can be made for all panels, the multi-panel precoder matrix may be expressed as $$W_{MP} = w_{PANEL} \otimes (W_1, W_2) = \underbrace{(w_{PANEL} \otimes I_{2MN})}_{\triangleq W_3} W_1 W_2 = W_3 W_1 W_2.$$

Proposal: For coherent Type I multi-panel codebook, consider using a ternary $W_3 W_1 W_2$ codebook structure where, $$W_3 = w_{PANEL} \otimes I_{2MN} \text{ and } w_{PANEL} = \begin{bmatrix} 1 \\ e^{j\alpha_{10}} \\ \vdots \\ e^{j\alpha_{(M_g-1)(N_g-1)}} \end{bmatrix}$$

selected on a wideband basis $W_1 W_2$ is according to the single-panel codebook Note: $W_1=I$ in case of $M=N=1$ for e.g. analogue panels Some options to design the codebook for $w_{PANEL}/W_3$:

Scalar Quantization: Each element of $W_{PANEL}$ is encoded independently and chosen from a PSK constellation. This will result in the best performance but will result in larger $W_3$ overhead.

Vector Quantization: The elements in $w_{PANEL}$ are jointly encoded and selected from a codebook.

Unstructured codebook: As the phase offsets between panels should be uncorrelated, an unstructured codebook, such as the LTE 4TX Householder rank-1 codebook, should work well.

2D-DFT codebook: For reference, should perform worse than the unstructured codebook.

Evaluation Results of Coherent Multi-Panel Codebook:

In the following simulation results comparing the different $W_3$-codebook designs are discussed. As a reference and baseline for comparison, we also evaluate the LTE Rel-13/14 DFT codebook with $M_g M \times N_g N$ port layout applied across the multiple panels. The evaluated $W_3$-codebook designs, as well as the associated overhead, are presented in In the following table. For all multi-panel codebooks, the LTE Rel-13/14 W1W2 codebook with M×N port layout is applied per panel.

The multi-panel antenna with four 4×4 panels as illustrated in FIG. 10 has been used in the simulations. A 2×2 subarray virtualization has been applied per panel, so that each panel comprises 8 ports, meaning that 32 ports is used in total. Performance has been evaluated in the 3GPP 3D UMi (Urban Micro) scenario using the FTP1 traffic model with 100 kB packet size. Remaining simulation parameters are listed in the Appendix.

In the following table, overhead for W1 and W3 for the different codebooks is listed:

| Codebook | | W1 + W3 overhead |
|---|---|---|
| LTE Rel-13 Class | O = 4 | 8 bits |
| ACB | O = 8 | 10 bits |
| | O = 16 | 12 bits |
| Scalar | BPSK | 9 bits |
| Quantization W3 | QPSK | 12 bits |
| 4TX Householder W3 | | 10 bits |
| 2D-DFT W3 | O = 1 | 8 bits |
| | O = 2 | 10 bits |
| | O = 4 | 12 bits |

Evaluation results are presented in the table below, depicting a performance of different codebooks in 3GPP 3D UMi scenario at 50% RU. As seen, applying the "Rel-13"-like codebook across panels is not very efficient and results in relatively poor performance compared to the multi-panel codebooks. Of the multi-panel codebooks, the scalar quantization W3 codebook of course performs the best, even when considering the overhead. The Householder W3 codebook gives slightly larger gains than the 2D-DFT codebook when compared at the same overhead.

| | CELL EDGE THROUGHPUT [BPS/HZ/USER] | NORMALISED USER THROUGHPUT [BPS/HZ/USER] | CELL EDGE GAIN [%] | NORMALIZED USER THROUGHPUT GAIN [%] |
|---|---|---|---|---|
| REL-13 CB O = 4 | 0.50592 | 2.3138 | 0 | 0 |
| REL-13 CB O = 8 | 0.51976 | 2.34 | 3 | 1 |
| REL-13 CB O = 12 | 0.53126 | 2.3562 | 5 | 2 |
| PANEL CB SCALAR QUANTIZATION BPSK | 0.59407 | 2.4833 | 17 | 7 |
| PANEL CB SCALAR QUANTIZATION QPSK | 0.72087 | 2.7172 | 42 | 17 |
| PANEL CB REL-8 HOUSEHOLDER | 0.6104 | 2.53 | 21 | 9 |
| PANEL CB DFT O = 1 | 0.49045 | 2.2937 | −3 | −1 |
| PANEL CB DFT O = 2 | 0.59376 | 2.4909 | 17 | 8 |
| PANEL CB DFT O = 4 | 0.6375 | 2.5683 | 26 | 11 |

Observations:
Applying a Rel-13 like codebook across the multiple antenna panels results in relatively poor performance, increasing oversampling factor does not increase codebook performance
Scalar quantization of panel cophasing yields best performance
Householder codebook performs better than DFT at the same overhead
As the differences in feedback overhead between the investigated schemes is only a few wideband bits, it makes sense to go for the best performing scheme. The following may be proposed:
For $W_{PANEL}$ codebook, consider using scalar quantization of panel cophasing coefficients with QPSK constellation.

SOME CONCLUSIONS

With respect to an applicability of multi-panel operation, as well as proposed and evaluated codebook designs for coherent multi-panel transmission, following observations may be considered:
It is not clear if explicit multi-panel support is required if NR only supports up to 32 antenna ports
If frequency and/or timing offset exists between panels, the induced ICI can prohibit coherent transmission between panels
A wideband panel co-phasing can be used to compensate for non-uniform panel spacing and different LO phase state.
A frequency-selective panel co-phasing is needed to compensate for timing misalignment between panels.
Applying a Rel-13 like codebook across the multiple antenna panels results in relatively poor performance, increasing oversampling factor does not increase codebook performance
Scalar quantization of panel cophasing yields best performance
Householder codebook performs better than DFT at the same overhead
Based on these observations, the following proposals may be derived:
A uniformly distributed wideband phase offset between panels should be compensated for in the coherent multi-panel codebook
The precoding within a panel should use the single-panel codebook
Frequency-selective panel cophasing is not supported For coherent Type I multi-panel codebook, consider using a ternary $W_3 W_1 W_2$ codebook structure where, $$W_3 = w_{PANEL} \otimes I_{2MN} \text{ and } w_{PANEL} = \begin{bmatrix} 1 \\ e^{j\alpha_{10}} \\ \vdots \\ e^{j\alpha_{(M_g-1)(N_g-1)}} \end{bmatrix}$$

selected on a wideband basis
$W_1 W_2$ is according to the single-panel codebook
Note: $W_1$=I in case of M=N=1 for e.g. analogue panels
For $W_{PANEL}$ codebook, consider using scalar quantization of panel cophasing coefficients with QPSK constellation Simulation Parameters:

| | |
|---|---|
| Carrier frequency | 2 GHz |
| Bandwidth | 10 MHz |
| Scenarios | 3D UMi 200 m ISD |
| Antenna Configurations | Non-Uniform Panel Array Mg = Ng = 2, M = N = 4, 2x2 virtualizaiton 130° tilt 0.8λ vertical antenna spacing, 0.5λ horizontal antenna spacing Panel spacing 2x that of uniform panel array (4λ horizontally, 6.4λ vertically) Random phase error between panels |
| Cell layout | 57 homogeneous cells |
| Wrapping | Radio distance based |
| UE receiver | MMSE-IRC |
| CSI periodicity | 5 ms |
| CSI delay | 5 ms |
| CSI mode | PUSCH Mode 3-2 |
| Outer loop Link Adaptation | Yes, 10% BLER target |
| UE noise figure | 9 dB |
| eNB Tx power | 41 dBm (UMi) |
| Traffic model | FTP Model 1, 100 kB packet size |
| UE speed | 3 km/h |
| Scheduling | Proportional fair in time and frequency |
| DMRS overhead | 2 DMRS ports |
| CSI-RS | Overhead accounted for. Channel estimation error modeled. |
| HARQ | Max 5 retransmissions |
| Handover margin | 3 dB |
| Transmission Mode | SU-MIMO |

The invention claimed is:
1. A method performed by a wireless communication device configured for use in a wireless communication system, the method comprising the wireless communication device:

determining, based on one or more structural properties of a multi-panel antenna array describing how the antenna array is structured into multiple panels, a precoder to recommend to a transmit radio node for applying to a transmission from the multi-panel antenna array;

signaling the determined precoder to the transmit radio node;

wherein the determined precoder is configured to apply, for each of the multiple panels, a panel-specific complex weight to all antenna ports corresponding to that antenna panel; and wherein the panel-specific complex weight is a phase shift with unitary amplitude.

2. The method of claim 1, wherein the one or more structural properties include, for each of one or more spatial dimensions in which the multiple panels are arranged, a number of panels into which the antenna array is structured in that spatial dimension.

3. The method of claim 1, wherein the one or more structural properties include a spatial arrangement of the multiple panels into which the antenna array is structured.

4. The method of claim 1, further comprising receiving signaling indicating the one or more structural properties.

5. The method of claim 4, wherein the signaling is radio resource control signaling.

6. The method of claim 4, wherein the signaling is received during a procedure for configuring a channel state information process or channel state information reference signal resource.

7. The method of claim 4, wherein the signaling is physical layer signaling; wherein the signaling is included in a downlink control information message on a physical downlink control channel.

8. The method of claim 4, wherein the signaling is included in a message that conveys an uplink grant for the wireless communication device to transmit a channel state information feedback report to the transmit radio node.

9. The method of claim 1, wherein the determining comprises determining a multi-panel precoding codebook based on the one or more structural properties.

10. The method of claim 9, wherein the determining the multi-panel precoding codebook comprises determining the multi-panel precoding codebook as being one of multiple different possible precoding codebooks respectively corresponding to different possible ways in which the antenna array is structurable into multiple panels.

11. The method of claim 9, wherein the determining the multi-panel precoding codebook comprises modifying a predefined precoding codebook based on the one or more structural properties.

12. The method of claim 9, wherein the determining further comprises selecting the precoder from the determined multi-panel precoding codebook, based on measurement of one or more reference signals transmitted from the multi-panel antenna array.

13. The method of claim 1:
wherein the precoder is determined from an inter-panel precoding codebook, wherein the inter-panel precoding codebook is a Discrete Fourier Transform (DFT) codebook;
further comprising signaling:
an index indicating a recommended intra-panel precoder selected from an intra-panel precoding codebook; and/or
an index indicating a recommended polarization co-phasing precoder selected from a polarization co phasing precoding codebook.

14. The method of claim 1, wherein the determined precoder co-phases panels of the multi-panel antenna array.

15. The method of claim 1:
wherein the multiple panels include at least some panels that have identical antenna port layouts and intra-panel antenna port indices; and
wherein the determined precoder applies the same phase offset between antenna ports that correspond to spatially adjacent panels and that have the same intra-panel antenna port indices.

16. The method of claim 1, wherein the determined precoder applies a phase offset between antenna ports corresponding to different panels that differs from a phase offset applied to antenna ports corresponding to the same panel.

17. The method of claim 1, wherein the determined precoder is configured to combine antenna ports corresponding to different antenna panels onto the same transmission layer.

18. The method of claim 1, wherein determining the precoder comprises determining, independently for each of the multiple panels, the panel-specific complex weight that is to be applied to all antenna ports corresponding to that panel.

19. The method of claim 1, wherein the precoder is determined based on measurement of one or more channel state information reference signals transmitted from the multi-panel antenna array on a set of one or more channel state information reference signal resources.

20. The method of claim 1 wherein the one or more structural properties include a total number of the multiple panels into which the antenna array is structured.

21. A method implemented by a transmit radio node configured for transmitting via a multi-panel antenna array in a wireless communication system, the method comprising the transmit radio node:

transmitting, to a wireless communication device, signaling indicating one or more structural properties of a multi-panel antenna array describing how the antenna array is structured into multiple panels;

receiving, responsive to transmitting the signaling and from the wireless communication device, signaling indicating a precoder that the wireless communication device recommends to the transmit radio node for applying to a transmission from the multi-panel antenna array;

wherein the determined precoder is configured to apply, for each of the multiple panels, a panel-specific complex weight to all antenna ports corresponding to that antenna panel; and wherein the panel-specific complex weight is a phase shift with unitary amplitude.

22. The method of claim 21, wherein the one or more structural properties include, for each of one or more spatial dimensions in which the multiple panels are arranged, a number of panels into which the antenna array is structured in that spatial dimension.

23. The method of claim 21, wherein the one or more structural properties include a spatial arrangement of the multiple panels into which the antenna array is structured.

24. The method of claim 21, further comprising:
determining a precoder based on the precoder recommended to the transmit radio node; and
precoding a transmission from the multi-panel antenna array using the determined precoder.

25. The method of claim 24:
wherein the precoder is determined from an inter-panel precoding codebook;

further comprising receiving, from the wireless communication device, signaling indicating:
- an index indicating a recommended intra-panel precoder selected from an intra-panel precoding codebook; and/or
- an index indicating a recommended polarization co-phasing precoder selected from a polarization co phasing precoding codebook.

26. The method of claim 24, wherein the determined precoder co-phases panels of the multi-panel antenna array.

27. The method of claim 24, wherein the determined precoder applies a phase offset between antenna ports corresponding to different panels that differs from a phase offset applied to antenna ports corresponding to the same panel.

28. The method of claim 21 wherein the one or more structural properties include a total number of the multiple panels into which the antenna array is structured.

29. A wireless communication device configured for use in a wireless communication system, the wireless communication device comprising:
- processing circuitry;
- memory containing instructions executable by the processing circuitry whereby the wireless communication device is configured to:
  - determine, based on one or more structural properties of a multi-panel antenna array describing how the antenna array is structured into multiple panels, a precoder to recommend to a transmit radio node for applying to a transmission from the multi-panel antenna array; and
  - signal the determined precoder to the transmit radio node;
- wherein the determined precoder is configured to apply, for each of the multiple panels, a panel-specific complex weight to all antenna ports corresponding to that antenna panel; and
- wherein the panel-specific complex weight is a phase shift with unitary amplitude.

30. A transmit radio node configured for use in transmitting via a multi-panel antenna array in a wireless communication system, the transmit radio node comprising:
- processing circuitry;
- memory containing instructions executable by the processing circuitry whereby the transmit radio node is configured to:
  - transmit, to a wireless communication device, signaling indicating one or more structural properties of a multi-panel antenna array describing how the antenna array is structured into multiple panels
  - receive, responsive to the transmitting the signaling and from the wireless communication device, signaling indicating a precoder that the wireless communication device recommends to the transmit radio node for applying to a transmission from the multi-panel antenna array;
- wherein the determined precoder is configured to apply, for each of the multiple panels, a panel-specific complex weight to all antenna ports corresponding to that antenna panel; and
- wherein the panel-specific complex weight is a phase shift with unitary amplitude.

* * * * *

UNITED STATES PATENT AND TRADEMARK OFFICE
CERTIFICATE OF CORRECTION

PATENT NO. : 11,038,566 B2
APPLICATION NO. : 16/475401
DATED : June 15, 2021
INVENTOR(S) : Faxér et al.

Page 1 of 2

It is certified that error appears in the above-identified patent and that said Letters Patent is hereby corrected as shown below:

In the Specification

In Column 6, Line 53, delete "equipped" and insert -- equipment --, therefor.

In Column 10, Line 63, delete "channel" and insert -- channel. --, therefor.

In Column 11, Line 31, delete "(CSI-RS)" and insert -- (CSI-RSs) --, therefor.

In Column 13, Line 17, delete "(l.m)" and insert -- (l,m) --, therefor.

In Column 13, Lines 22-23, delete "DFT beams' and DFT precoders'" and insert -- 'DFT beams' and 'DFT precoders' --, therefor.

In Column 14, Line 2, delete "$s_1=i_1N_2+i_2$" and insert -- $s_1=i_1N_2+i_2$ and --, therefor.

In Column 14, Lines 62-64, delete "$W_{2D,DP}^{(R)}=[w_{2D,DP}(l_1,m_1,\phi_1) w_{2D,DP}(l_2,m_2,\phi_2) \ldots]$" and insert -- $W_{2D,DP}^{(R)} = [w_{2D,DP}(l_1,m_1,\phi_1)\ w_{2D,DP}(l_2,m_2,\phi_2)\ \cdots]$ --, therefor.

In Column 16, Lines 50-51, delete "$e^{\frac{j2\pi k(1+\Delta_{panel})}{N}}$" and insert -- $e^{\frac{j2\pi k(1+\Delta_{panel})}{N}}$ --, therefor.

In Column 18, Line 61, delete "==" and insert -- = --, therefor.

In Columns 21-22, in Table 1, Lines 5-6, delete "$u_5 = [1\ (1-j)/\sqrt{2}\ j\ (-1-j)/\sqrt{2}]^T$ $u_6 = [1\ (1+j)/\sqrt{2}\ -j\ (-1+j)/\sqrt{2}]^T$"

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office* and insert -- $u_6 = \begin{bmatrix} 1 & (1+j)/\sqrt{2} & -j & (-1+j)/\sqrt{2} \end{bmatrix}^T$ --, therefor.

~~$u_5 = \begin{bmatrix} 1 & (1-j)/\sqrt{2} & j & (-1-j)/\sqrt{2} \end{bmatrix}^T$~~

In Column 24, Line 20, delete "and or" and insert -- and/or --, therefor.

In Column 26, Lines 10-11, delete "$e^{\frac{j2\pi k(1+\Delta_{panel})}{N}}$" and insert -- $e^{\frac{j2\pi k(1+\Delta_{panel})}{N}}$ --, therefor.

In Column 27, Line 5, delete "a" and insert -- A --, therefor.

In Column 27, Line 7, delete "codebook" and insert -- codebook. --, therefor.

In Column 27, Line 9, delete "codebook" and insert -- codebook. --, therefor.

In Column 27, Line 10, delete "supported" and insert -- supported. --, therefor.

In Column 28, Lines 26-27, delete "in In the" and insert -- in the --, therefor.

In Column 30, Line 41, delete "virtualizaiton" and insert -- virtualization --, therefor.

In the Claims

In Column 31, Lines 66-67, in Claim 13, delete "co phasing" and insert -- co-phasing --, therefor.

In Column 33, Lines 7-8, in Claim 25, delete "co phasing" and insert -- co-phasing --, therefor.

In Column 34, Line 18, in Claim 30, delete "panels" and insert -- panels; --, therefor.